United States Patent
Cho

(10) Patent No.: US 9,073,675 B2
(45) Date of Patent: Jul. 7, 2015

(54) CHIPLESS RFID STRUCTURE, CAP, CAN AND PACKAGING MATERIAL, STACKED FILM FOR PREVENTING FORGERY, METHOD FOR FABRICATING THE SAME; RFID TAG, RFID SYSTEM AND METHOD FOR CONTROLLING THE SAME; CERTIFICATE FOR CHIPLESS RFID AND METHOD FOR AUTHENTICATING THE SAME

(75) Inventor: Young Bin Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 98 days.

(21) Appl. No.: 13/504,181

(22) PCT Filed: Oct. 26, 2010

(86) PCT No.: PCT/KR2010/007366
§ 371 (c)(1),
(2), (4) Date: Apr. 26, 2012

(87) PCT Pub. No.: WO2011/052963
PCT Pub. Date: May 5, 2011

(65) Prior Publication Data
US 2012/0206242 A1 Aug. 16, 2012

(30) Foreign Application Priority Data

| Oct. 26, 2009 | (KR) | 10-2009-0101637 |
| Oct. 26, 2009 | (KR) | 10-2009-0101640 |
| Nov. 10, 2009 | (KR) | 10-2009-0108252 |
| Nov. 10, 2009 | (KR) | 10-2009-0108256 |
| Nov. 10, 2009 | (KR) | 10-2009-0108258 |
| Nov. 10, 2009 | (KR) | 10-2009-0108264 |
| Nov. 13, 2009 | (KR) | 10-2009-0109743 |

(51) Int. Cl.
*H04Q 5/22* (2006.01)
*B65D 51/24* (2006.01)
(Continued)

(52) U.S. Cl.
CPC .............. *B65D 51/24* (2013.01); *B65D 17/165* (2013.01); *B65D 65/38* (2013.01); *B65D 2203/10* (2013.01); *B65D 2517/0052* (2013.01); *G06K 19/0717* (2013.01)

(58) Field of Classification Search
CPC ................................................ G06K 7/0008
USPC .................... 235/487, 491; 340/572.1, 10.42
See application file for complete search history.

(56) References Cited

U.S. PATENT DOCUMENTS 5,947,256 A    9/1999  Patterson
6,181,287 B1 * 1/2001  Beigel ........................... 343/741
(Continued)

FOREIGN PATENT DOCUMENTS

JP   60-171854 U   11/1985
JP   2001-512592 A   8/2001
(Continued)

OTHER PUBLICATIONS

International Search Report in International Application No. PCT/KR2010/007366, filed Oct. 26, 2010.
(Continued)

*Primary Examiner* — Hai Phan
*Assistant Examiner* — Zhen Y Wu
(74) *Attorney, Agent, or Firm* — Saliwanchik, Lloyd & Eisenschenk

(57) ABSTRACT

The present invention relates to an RFID (Radio Frequency Identification) structure changing color according to the temperature, a method for fabricating thereof; a stacked film for preventing forgery, a method for fabricating thereof; an RFID tag, an RFID system and a method for controlling thereof; an RFID cap, a method for manufacturing thereof, a method for manufacturing container with contents; an RFID can, a method for manufacturing thereof; a packaging material, a method for manufacturing thereof, and a method for packaging product using the same; and a certificate for chipless RFID and a method for authenticating the same.

15 Claims, 15 Drawing Sheets

(51) Int. Cl.
*B65D 17/00* (2006.01)
*B65D 65/38* (2006.01)
*G06K 19/07* (2006.01)

(56) References Cited

U.S. PATENT DOCUMENTS

| | | | |
|---|---|---|---|
| 6,891,474 B1 * | 5/2005 | Fletcher | 340/572.1 |
| 7,506,813 B2 | 3/2009 | Christofferson et al. | |
| 7,594,611 B1 * | 9/2009 | Arrington, III | 235/487 |
| 7,653,982 B2 | 2/2010 | Chopra et al. | |
| 2005/0024290 A1 * | 2/2005 | Aisenbrey | 343/873 |
| 2005/0083180 A1 * | 4/2005 | Horwitz et al. | 340/10.4 |
| 2006/0196936 A1 * | 9/2006 | Christofferson et al. | 235/385 |
| 2007/0158436 A1 * | 7/2007 | Ichikawa et al. | 235/492 |
| 2007/0206705 A1 * | 9/2007 | Stewart | 375/316 |
| 2008/0252425 A1 * | 10/2008 | Okegawa et al. | 340/10.1 |
| 2008/0290648 A1 * | 11/2008 | Koops et al. | 283/81 |
| 2009/0096585 A1 * | 4/2009 | Herrod et al. | 340/10.2 |
| 2010/0066538 A1 * | 3/2010 | Ogata et al. | 340/572.7 |
| 2010/0073142 A1 | 3/2010 | Kim | |

FOREIGN PATENT DOCUMENTS

| | | |
|---|---|---|
| JP | 2002-007992 A | 1/2002 |
| JP | 2002-085416 A | 3/2002 |
| JP | 2002-236899 A | 8/2002 |
| JP | 2003-155062 A | 5/2003 |
| JP | 2005-129183 A | 5/2005 |
| JP | 2009-078838 A | 4/2009 |
| JP | 2009-124707 A | 6/2009 |
| KR | 10-2006-0026631 A | 3/2006 |
| KR | 10-2008-0041411 A | 5/2008 |
| KR | 10-2009-0066475 A | 6/2009 |
| KR | 10-0911198 B1 | 8/2009 |
| KR | 10-2009-0107998 A | 10/2009 |
| WO | WO-03/107309 A2 | 12/2003 |
| WO | WO-2008/056848 A1 | 5/2008 |

OTHER PUBLICATIONS

Notice of Allowance dated Apr. 15, 2011 in Korean Application No. 10-2009-0101637, filed Oct. 26, 2009.
Office Action dated Apr. 29, 2011 in Korean Application No. 10-2009-0108252, filed Nov. 10, 2009.
Notice of Allowance dated Dec. 28, 2011 in Korean Application No. 10-2009-0108252, filed Nov. 10, 2009.
Office Action dated Oct. 24, 2011 in Korean Application No. 10-2009-0108256, filed Nov. 10, 2009.
Office Action dated Jul. 29, 2011 in Korean Application No. 10-2009-0108258, filed Nov. 10, 2009.
Notice of Allowance dated Jun. 15, 2011 in Korean Application No. 10-2009-0108264, filed Nov. 10, 2009.
Notice of Allowance dated Sep. 19, 2011 in Korean Application No. 10-2009-0109743, filed Nov. 13, 2009.

* cited by examiner (2a)　　　　　　　　(2b)

(7a)　　　(7b)　　　(7c)

(40a)

(40b)

CHIPLESS RFID STRUCTURE, CAP, CAN AND PACKAGING MATERIAL, STACKED FILM FOR PREVENTING FORGERY, METHOD FOR FABRICATING THE SAME; RFID TAG, RFID SYSTEM AND METHOD FOR CONTROLLING THE SAME; CERTIFICATE FOR CHIPLESS RFID AND METHOD FOR AUTHENTICATING THE SAME

CROSS-REFERENCE TO RELATED APPLICATIONS

This application is the U.S. national stage application of International Patent Application No. PCT/KR2010/007366, filed Oct. 26, 2010, which claims priority to Korean Application Nos. 10-2009-0101637, filed Oct. 26, 2009; 10-2009-0101640, filed Oct. 26, 2009; 10-2009-0108252, filed Nov. 10, 2009; 10-2009-0108256, filed Nov. 10, 2009; 10-2009-0108258, filed Nov. 10, 2009; 10-2009-0108264, filed Nov. 10, 2009; and 10-2009-0109743, filed Nov. 13, 2009, the disclosures of each of which are incorporated herein by reference in their entirety.

TECHNICAL FIELD

The present invention relates to a RFID (Radio Frequency Identification) structure changing color according to the temperature, method for fabricating thereof; stacked film for preventing forgery, method for fabricating thereof; RFID tag, RFID system and method for controlling thereof; RFID cap, method for manufacturing thereof, method for manufacturing container with contents; RFID can, method for manufacturing thereof; packaging material, method for manufacturing thereof, and method for packaging product using the same; and certificate for chipless RFID and method for authenticating the same.

BACKGROUND ART

RFID (Radio frequency IDentification) is a general term for a technology of processing information of items by using a compact semiconductor chip. More specifically, the RFID technology enables a non-contact recognition system which wirelessly transmits information of a product and peripheral information of the product using a compact chip, which is attached to a variety of products. The system that has appeared since 1980 is called a radio recognition system, a radio wave identification system or a radio identification system. The RFID system basically include an RFID tag for storing data, and an RFID reader capable of reading out data stored in the RFID tag.

An RFID tag consists of a semiconductor transponder chip and an antenna, and is categorized into a passive type and an active type. While a passive RFID tag operates by energies provided from a frequency signal of a reader without an internal power source, an active RFID tag has a built-in RF tag battery for self-operation. An RFID tag may be categorized into a silicon-semiconductor chip tag and a non-chip tag which is formed of only an LC element and a plastic or polymer element.

The RFID technology does not need to directly contact or scan an item within a visible band of a reader like in a barcode technology. Having such advantages, the RFID technology is considered as a replacement for a barcode technology, and an application range of the technology is expected to expand continuously. A low-frequency (30 kHz-500 kHz) RFID system is used for transmission in a short distance of less than 1.8 m, and a high-frequency (850 MHz-950 MHz or 2.4 GHz-2.5 GHz) RFID system is used for transmission in a long distance of more than 27 m.

Therefore, the RFID system may be optionally used depending on whether the recognition distance is long or short and depending on radio frequency signals corresponding to application range.

The RFID (Radio Frequency IDentification) system, which includes an RFID reader having reading and decoding functions, an RFID tag including unique information, operation software, and a network, processes information by identifying a thin flat tag fixed to an item. The RFID reader modulates a radio frequency signal having a specific carrier frequency and transmits the signal.

In a case a product attached with the RFID tag is positioned at a read zone of the RFID reader, the RFID tag receives a signal transmitted by the RFID reader, responds to the received signal, and transmits to the RFID reader a predetermined information stored in the built-in memory.

DISCLOSURE OF INVENTION

Technical Problem

The present invention is disclosed to implement a chipless RFID technology using a pattern made by metal fibers dispersed on a subject or conductive polymer fibers.

Technical problems to be solved by the present invention are not restricted to the above-mentioned, and any other technical problems not mentioned so far will be clearly appreciated from the following description by skill in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the disclosure, as embodied and broadly described, there is provided, as a first general aspect of the present invention, a chipless RFID structure changing colors according to temperature, the structure characterized by: a transparent resin film; a transparent resin layer printed on an upper surface of the transparent resin film and dispersed with metal fibers or conductive polymer fibers; and a thermochromic dye printing layer printed on an upper surface of the transparent resin layer.

In a second general aspect of the present invention, there is provided a chipless RFID structure changing colors according to temperature, the structure characterized by: a transparent resin film; a transparent resin layer printed on an upper surface of the transparent resin film and dispersed with metal fibers or conductive polymer fibers; a transmissive resin layer printed on an upper surface of the transparent resin layer, a thermochromic dye printing layer printed on a partial upper area of the transmissive resin layer; and an added information printing layer printed on a remaining upper area of the transmissive resin layer.

In some exemplary embodiments of the present invention, material of the transparent resin film may include one of a group consisting of PET (Poly Ethylene Terephthalate), PE (Poly Ethylene) and PVE (Poly Vinyl Chloride).

In some exemplary embodiments of the present invention, the metal fibers may include stainless steel fibers.

In some exemplary embodiments of the present invention, the transparent resin film may be sequentially formed thereunder with an adhesive layer and a release paper.

In some exemplary embodiments of the present invention, each of the metal fibers or the conductive polymer fibers may take the shape of a length longer than a thickness or with at least one curvature.

In some exemplary embodiments of the present invention, each of the metal fibers or the conductive polymer fibers may include a textile fiber, and a metal layer or a conductive polymer layer coated with the textile fiber.

In a third general aspect of the present invention, there is provided a method for fabricating a chipless RFID structure changing colors according to temperature, the method characterized by: forming metal fibers or conductive polymer fibers; dispersing the metal fibers or the conductive polymer fibers in hardening solvent; printing on an upper surface of the transparent resin film the hardening solvent dispersed with the metal fibers or conductive polymer fibers and comprised of transparent resin; forming a transparent resin layer dispersed with the metal fibers or conductive polymer fibers by hardening the hardening solvent dispersed with the printed metal fibers or the conductive polymer fibers; and forming a thermochromic dye printing layer on an upper surface of the hardened transparent resin layer.

In some exemplary embodiments of the present invention, the step of forming the metal fibers or conductive polymer fibers may include forming the metal fibers by coating metal or conductive polymer, or by grinding a metal body or a conductive polymer body.

In a fourth general aspect of the present invention, there is provided a stacked film for preventing forgery, the film characterized by: a hologram film configured to change an image color in response to a reflection angle of incident light or a refractive angle; and a transparent resin layer printed with the hologram film and dispersed with metal fibers or conductive polymer fibers.

In some exemplary embodiments of the present invention, the hologram film may be sequentially formed thereunder with an adhesive layer or a release paper.

In a fifth general aspect of the present invention, there is provided a stacked film for preventing forgery, the film characterized by: a hologram film configured to change an image color in response to a reflection angle of incident light or a refractive angle; and a transparent resin layer adhered to an upper surface of the hologram film and dispersed with metal fibers or conductive polymer fibers.

In some exemplary embodiments of the present invention, the transparent resin layer dispersed with metal fibers or conductive polymer fibers may include a transparent resin film; and a transparent resin layer printed on an upper surface of the transparent resin film and dispersed with metal fibers or conductive polymer fibers.

In some exemplary embodiments of the present invention, material of the transparent resin film may include one of a group consisting of PET (Poly Ethylene Terephthalate), PE (Poly Ethylene) and PVE (Poly Vinyl Chloride).

In a sixth general aspect of the present invention, there is provided a stacked film for preventing forgery, the film characterized by: a reflection plate that is embossed; a transmissive resin layer formed on an upper surface of the reflection plate; a transparent resin layer printed on an upper surface of the transmissive resin layer and dispersed with metal fibers or conductive polymer fibers; a image-formed resin layer formed on an upper surface of the transmissive resin layer; and a surface resin layer formed on an upper surface of the image-formed resin layer.

In some exemplary embodiments of the present invention, the metal fibers may include stainless steel fibers.

In some exemplary embodiments of the present invention, each of the metal fibers or the conductive polymer fibers may take a shape with a length longer than a thickness or with at least one curvature.

In some exemplary embodiments of the present invention, each of the metal fibers or the conductive polymer fibers may include a textile fiber, and a metal layer coated with the textile fiber or a conductive polymer layer.

In a seventh general aspect of the present invention, there is provided a method for fabricating a stacked film for preventing forgery, the method characterized by: forming metal fibers or conductive polymer fibers; dispersing the metal fibers or the conductive polymer fibers in hardening solvent; printing the hardening solvent dispersed with the metal fibers or conductive polymer fibers and comprised of transparent resin on a hologram film configured to change image color in response to a reflection angle or a refractive angle of incident light; forming a transparent resin layer dispersed with the metal fibers or conductive polymer fibers by hardening the hardening solvent dispersed with the printed metal fibers or the conductive polymer fibers.

In some exemplary embodiments of the present invention, the step of forming the metal fibers or conductive polymer fibers may include forming the metal fibers by coating metal or conductive polymer, or by grinding a metal body or a conductive polymer body.

In an eighth general aspect of the present invention, there is provided an RFID tag, the tag characterized by: a base film; a transparent resin layer printed on an upper surface of the base film and dispersed with metal fibers or conductive polymer fibers; an antenna formed on an upper surface of the transparent resin layer; and a tag chip connected to the antenna.

In some exemplary embodiments of the present invention, the antenna may be a conductive paste printed on an upper surface of the transparent resin layer.

In some exemplary embodiments of the present invention, each of the metal fibers or the conductive polymer fibers may take a shape with a length longer than a thickness or with at least one curvature.

In some exemplary embodiments of the present invention, each of the metal fibers or the conductive polymer fibers may include a textile fiber, and a metal layer coated with the textile fiber or a conductive polymer layer, or a metal fiber of a single material, or conductive polymer fibers.

In a ninth general aspect of the present invention, there is provided an RFID system, the system characterized by: an RFID tag including a base film, a transparent resin layer printed on an upper surface of the base film and dispersed with metal fibers or conductive polymer fibers, an antenna formed on an upper surface of the transparent resin layer, and a tag chip connected to the antenna; and a reader capable of recognizing a first identification (ID) by the tag chip, and capable of recognizing a second identification (ID) by the metal fibers or conductive polymer fibers dispersed on the transparent resin layer.

In some exemplary embodiments of the present invention, the reader may include a UHF (Ultra High Frequency) reader module configured to receive a first RF (Radio Frequency) signal transmitted by the antenna connected to the tag chip to recognize the first ID; and a chipless reader module configured to receive a second RF signal reflected from the metal fibers or conductive polymer fibers dispersed on an upper surface of the transparent resin layer to recognize the second ID.

In some exemplary embodiments of the present invention, the UHF reader module may include a first RF receiver configured to receive a first RF signal transmitted from an antenna connected to the tag chip; a BB (Base Band) processor configured to convert the first RF signal received by the first RF receiver to a BB signal; and a first controller configured to detect a first ID using the BB signal converted by the BB processor.

In some exemplary embodiments of the present invention, the chipless reader module may include a second RF receiver configured to receive a second RF signal reflected by metal fibers or conductive polymer fibers dispersed on the transparent resin layer; a DSP (Digital Signal Processor) configured to digital-signal-process the second RF signal received by the second RF receiver; and a second controller configured to detect a second ID using the signal digitally processed by the DSP.

In some exemplary embodiments of the present invention, the terminal may include an ID verifier configured to verify matching between the first ID recognized by the UHF reader module and the second ID recognized by the chipless reader module.

In some exemplary embodiments of the present invention, the ID verifier may be an ID verifier including an ID generating function using the first ID and/or second ID.

In some exemplary embodiments of the present invention, the RFID system may include a server configured to determine a right capable of issuing added information by receiving an ID from the terminal, and to issue the added information to the terminal if there is the right capable of issuing the added information.

In some exemplary embodiments of the present invention, the terminal may be one of a mobile terminal, a notebook, a PMP and an MP3.

In a tenth general aspect of the present invention, there is provided a method for controlling an RFID system, the method characterized by: reading an RFID tag using a reader of a terminal; determining whether metal fibers or conductive polymer fibers are present on the RFID tag as a result of reading by the reader of the terminal; recognizing an ID contained in the metal fibers or the conductive polymer fibers of the RFID tag, if it is determined as a result of reading by the reader of the terminal that metal fibers or conductive polymer fibers are present on the RFID tag; and recognizing the ID contained in the tag chip of the RFID tag.

In an eleventh general aspect of the present invention, there is provided a method for controlling an RFID system, the method characterized by: reading an RFID tag using a reader of a terminal; determining whether metal fibers or conductive polymer fibers are present on the RFID tag as a result of reading by the reader of the terminal; recognizing a first ID contained in the metal fibers or the conductive polymer fibers of the RFID tag, if it is determined as a result of reading by the reader of the terminal that metal fibers or conductive polymer fibers are present on the RFID tag; recognizing a second ID contained in the tag chip of the RFID tag; determining whether the first ID and the second ID are matched; transmitting a third ID to a server including added information, if the first ID and the second ID are matched; determining whether the third ID received by the server has a right to issue added information; and transmitting and issuing, by the server, the added information to the terminal, if the third ID received by the server has the right to issue the added information.

In some exemplary embodiments of the present invention, the third ID may be an ID generated by using the first ID or the second ID, or the first ID and/or the second ID.

In a twelfth general aspect of the present invention, there is provided an RFID cap, characterized by: a cap molding structure dispersed with metal fibers or conductive polymer fibers; and a label printing layer printed on an upper surface of the cap molding structure.

In a thirteenth general aspect of the present invention, there is provided an RFID cap, characterized by: a cap structure; a printing layer printed on an upper surface of the cap structure and dispersed with metal fibers or conductive polymer fibers; and a label printing layer printed on the printing layer.

In a fourteenth general aspect of the present invention, there is provided an RFID cap, characterized by: a cap structure including a metal plate and a coating layer coated on the metal layer and dispersed with metal fibers or conductive polymer fibers; and a label printing layer printed on an upper surface of the cap structure.

In some exemplary embodiments of the present invention, each of the metal fibers or the conductive polymer fibers may take the shape of a length longer than a thickness or with at least one curvature.

In some exemplary embodiments of the present invention, each of the metal fibers or the conductive polymer fibers may include a textile fiber, and a metal layer or a conductive polymer layer coated with the textile fiber, or a metal fiber or a conductive polymer fiber of a single material.

In a fifteenth general aspect of the present invention, there is provided a method for manufacturing an RFID cap, characterized by: forming metal fibers or conductive polymer fibers; dispersing the metal fibers or the conductive polymer fibers on a transparent molding resin; molding a transparent molding resin dispersed with metal fibers or conductive polymer fibers to form a cap molding structure dispersed with metal fibers or conductive polymer fibers; and printing a label on an upper surface of the cap molding structure.

In a sixteenth general aspect of the present invention, there is provided a method for manufacturing a container with contents, characterized by: preparing one of an RFID cap including a cap molding structure dispersed with metal fibers or conductive polymer fibers and a label printing layer printed on an upper surface of the cap molding structure, an RFID cap including a cap structure, a printing layer printed on an upper surface of the cap structure and dispersed with metal fibers or conductive polymer fibers and a label printing layer printed on the printing layer, and an RFID cap including a cap structure including a metal plate and a coating layer coated on the metal layer and dispersed with metal fibers or conductive polymer fibers and a label printing layer printed on an upper surface of the cap structure; pouring contents into a container; sealing the container with the RFID cap; recognizing ID by reading, by an RFID reader, the metal fibers or conductive polymer fibers of the RFID cap; and registering the ID on a server by matching the ID recognized by the RFID reader to manufacturing information.

In some exemplary embodiments of the present invention, a timing of recognizing the ID by using the RFID reader may be the moment in which the container is sealed by the RFID cap.

In a seventeenth general aspect of the present invention, there is provided an RFID can, characterized by: an upper surface-opened container; a can lip configured to seal an upper-opened surface of the container; and a can opener coupled to the can lid, wherein at least part of an upper area of the can lid or can opener is formed with a coating layer dispersed with metal fibers or conductive polymer fibers.

In some exemplary embodiments of the present invention, the can lid or the can opener may include a metal plate, an insulation layer formed on an upper surface of the metal plate, and a coating layer coated on an upper surface of the insulation layer and dispersed with metal fibers or conductive polymer fibers.

In some exemplary embodiments of the present invention, material of the metal fibers may be stainless steel fiber.

In some exemplary embodiments of the present invention, each of the metal fibers or the conductive polymer fibers may take the shape of a length longer than a thickness or with at least one curvature.

In some exemplary embodiments of the present invention, each of the metal fibers or the conductive polymer fibers may include a textile fiber, and a metal layer or a conductive polymer layer coated with the textile fiber, or a metal fiber or a conductive polymer fiber of a single material.

In an eighteenth general aspect of the present invention, there is provided a method for manufacturing an RFID can, characterized by: forming on at least part of an upper area of a can lid or a can opener a coating layer dispersed with metal fibers or conductive polymer fibers; coupling the cap opener to the cap lid; pouring contents into an upper surface-opened container; sealing the upper-opened area of the container with the can lid coupled with the can opener; recognizing an ID by reading, by an RFID reader, the metal fibers or conductive polymer fibers; and registering the ID on a server by matching the ID recognized by the RFID reader to manufacturing information of the RFID can.

In some exemplary embodiments of the present invention, the step of forming, on at least part of an upper area of a can lid or a can opener, a coating layer dispersed with metal fibers or conductive polymer fibers may include forming an insulation layer at an upper surface of a metal plate, forming at an upper surface of the insulation layer a coating layer dispersed with metal fibers or conductive polymer fibers, and forming a can lid or a can opener by putting a metal plate formed with the insulation layer and coating layer into a heated forming frame.

In some exemplary embodiments of the present invention, the contents may be one of liquid, solid, and a mixture of the liquid and the solid.

In some exemplary embodiments of the present invention, a timing of recognizing the ID by using the RFID reader may be the moment in which the container is sealed by the RFID lid coupled with the can opener.

In a nineteenth general aspect of the present invention, there is provided a packaging material for RFID, characterized by: a sheet; a packaging printing layer printed on an upper surface of the sheet; and a transparent resin layer printed on the packaging printing layer and dispersed with metal fibers or conductive polymer fibers.

In some exemplary embodiments of the present invention, the packaging material may include a transparent resin film fixed at a transparent resin layer, formed with at least one product shape unit and dispersed with metal fibers or conductive polymer fibers.

In some exemplary embodiments of the present invention, the packaging material may include at least one product shaping unit.

In some exemplary embodiments of the present invention, the transparent resin film dispersed with metal fibers or conductive polymer fibers may include a resinous transparent film, and a transparent resin layer printed on the resinous transparent film and dispersed with metal fibers or conductive polymer fibers.

In some exemplary embodiments of the present invention, material of the transparent resin film may include one of a group consisting of PET (Poly Ethylene Terephthalate), PE (Poly Ethylene) and PVE (Poly Vinyl Chloride).

In some exemplary embodiments of the present invention, each of the metal fibers or the conductive polymer fibers may take the shape of a length longer than a thickness or with at least one curvature.

In some exemplary embodiments of the present invention, the packaging printing layer may include a code printing layer which is one of a one dimensional (1D) authenticating code like manufacturing information or a bar code, a two dimensional (2D) authenticating code, a three dimensional (3D) authenticating code, and a color code.

In some exemplary embodiments of the present invention, each of the metal fibers or the conductive polymer fibers may include a textile fiber, and a metal layer or a conductive polymer layer coated with the textile fiber, or a metal fiber or a conductive polymer fiber of a single material.

In a twentieth general aspect of the present invention, there is provided a method for manufacturing a packaging material for RFID, characterized by: forming metal fibers or conductive polymer fibers; dispersing the metal fibers or conductive polymer fibers in transparent molding resin; molding the transparent molding resin dispersed with metal fibers or conductive polymer fibers to form at least one product shape unit and forming a transparent resin film dispersed with metal fibers or conductive polymer fibers; and assembling a transparent resin film dispersed with the metal fibers or conductive polymer fibers on a sheet printed on an upper surface of the packaging printing layer or a sheet printed with a transparent resin layer dispersed with the metal fibers or conductive polymer fibers.

In a twentieth general aspect of the present invention, there is provided a method for manufacturing a packaging material for RFID, characterized by: forming metal fibers or conductive polymer fibers; dispersing the metal fibers or the conductive polymer fibers in transparent printing solution; printing the transparent printing solution dispersed with metal fibers or conductive polymer fibers on an upper surface of a resinous transparent film; forming by pouring the resinous transparent film printed with the transparent printing solution dispersed with metal fibers or conductive polymer fibers; and assembling a transparent resin film dispersed with the metal fibers or conductive polymer fibers on a sheet printed on an upper surface of the packaging printing layer or a sheet printed with a transparent resin layer dispersed with the metal fibers or conductive polymer fibers.

In some exemplary embodiments of the present invention, the step of forming the metal fibers or conductive polymer fibers may include forming the textile fibers by coating metal or conductive polymer, or by grinding a metal body or a conductive polymer body.

In a twenty first general aspect of the present invention, there is provided a method for packaging product using packaging material, characterized by: preparing a sheet, a packaging printing layer printed on an upper surface of the sheet, an RFID packaging material fixed on the packaging printing layer and formed with at least one product shape unit and including a transparent resin film dispersed with metal fibers or conductive polymer fibers; inserting a product into the product shape unit of transparent resin film dispersed with the metal fibers or conductive polymer fibers, and packaging the product by coupling the transparent resin film with the a base plate such that the product shape unit can be tightly sealed; recognizing an ID by reading, by an RFID reader, the metal fibers or conductive polymer fibers; and registering the ID with a server by matching the ID recognized by the RFID reader with packaging information.

In a twenty second general aspect of the present invention, there is provided a certificate for chipless RFID, characterized by: an object; a printing layer printed with certificate contents on the object; and a transparent resin layer printed on the object and/or printing layer, and dispersed with metal fibers or conductive polymer fibers.

In some exemplary embodiments of the present invention, the transparent resin layer dispersed with metal fibers or conductive polymer fibers may be printed on a partial area of the object and/or printing layer.

In some exemplary embodiments of the present invention, the certificate for chipless RFID may be formed with a certificate code printing layer printed on the other partial area of the object and/or printing layer, where the certificate code printing layer is discrete from the transparent resin layer.

In a twenty third general aspect of the present invention, there is provided a certificate for chipless RFID, characterized by: an object; a printing layer printed with certificate contents on the object; and a sticker including a transparent resin adhered to the object and/or a printing layer, and dispersed with holograms and metal fibers or conductive polymer fibers.

In some exemplary embodiments of the present invention, the sticker may include a hologram film changing colors of image in response to a reflection angle or refraction angle of incident light; and a transparent resin layer printed on or adhered to an upper surface of the hologram film and dispersed with metal fibers or conductive polymer fibers.

In some exemplary embodiments of the present invention, the transparent resin film dispersed with metal fibers or conductive polymer fibers may include a transparent resin film, and a transparent resin layer printed on an upper surface of the transparent resin film and dispersed with metal fibers or conductive polymer fibers.

In some exemplary embodiments of the present invention, the sticker may be adhered to a partial area of the object and/or printing layer.

In some exemplary embodiments of the present invention, the certificate for chipless RFID may be formed with a certificate code printing layer printed on the other partial area of the object and/or printing layer, where the certificate code printing layer is discrete from the sticker.

In some exemplary embodiments of the present invention, the certificate code printing layer may be a layer printed with an intrinsic ID code, and one of a one dimensional (1D) authenticating code, a two dimensional (2D) authenticating code, a three dimensional (3D) authenticating code, and a color code.

In a twenty fourth general aspect of the present invention, there is provided a method for authenticating a certificate for chipless RFID, characterized by: reading, by an RFID reader, a certificate for chipless RFID; determining, as a result of the reading of the certificate for chipless RFID, whether the certificate for chipless RFID is present with metal fibers or conductive polymer fibers; and recognizing an ID contained in the metal fibers or conductive polymer fibers of the certificate for chipless RFID, if the certificate for chipless RFID is present with metal fibers or conductive polymer fibers.

In some exemplary embodiments of the present invention, the method for authenticating a certificate for chipless RFID may include, subsequent to the step of recognizing the ID, transmitting the recognized ID to a server equipped with added information; determining whether the ID received by the server has a right capable of issuing the added information; and issuing the added information by transmitting, by the server, the added information to a terminal, if the received ID has a right capable of being issued with the added information.

In some exemplary embodiments of the present invention, the method for authenticating a certificate for chipless RFID may include, subsequent to the step of recognizing the ID, where the certificate for chipless RFID is formed with a certificate code printing layer that is provided with a certificate code, photographing the certificate code printing layer of the certificate for chipless RFID to recognize the ID contained in the certificate code printing layer; determining whether the ID recognized by the metal fibers or conductive polymer fibers matches to the ID recognized by the certificate code printing layer; transmitting the ID recognized by the metal fibers or conductive polymer fibers and/or the ID recognized by the certificate code printing layer to a server equipped with added information, if the ID recognized by the metal fibers or conductive polymer fibers matches to the ID recognized by the certificate code printing layer; determining, by the server, whether the received ID has a right capable of being issued with added information; and issuing the added information by transmitting, by the server, the added information to a terminal, if the received ID has a right capable of being issued with the added information.

The invention of certificate for chipless RFID and the invention of method for authenticating the certificate may be applied to the certificate, the packaging material, the can and the lid at the same time.

Advantageous Effects of Invention

As explained in the foregoing, the present invention has an advantageous effect in that the RFID structure of the present invention may be attached to a food product group that determines freshness and taste according to colors to recognize a temperature state of the food product group.

The chipless RFID structure changing color according to temperature has an advantageous effect in that a pattern made by metal fibers or conductive polymer fibers dispersed on a transparent resin layer becomes a unique pattern to have an intrinsic value, such that the structure can be utilized for RFID.

The present invention has an advantageous effect in that a transparent resin layer dispersed with metal fibers or conductive polymer fibers is formed to detect an intrinsic value such as an ID using a reader, whereby a technique of chipless RFID can be implemented.

The stacked film for preventing forgery according to the present invention has an advantageous effect in that a transparent resin layer dispersed with metal fibers or conductive polymer fibers is printed on a hologram film to change colors of an image according to viewing angles, and to change an image shape according to an angle viewed by the metal fibers or the conductive polymer fibers, whereby an intrinsicality can be provided.

The present invention has an advantageous effect in that one tag can be provided with two IDs, whereby the two IDs can implement a more accurate authentication.

The present invention has an advantageous effect in that even if one ID provided on a tag chip is hacked, another ID provided on the metal fibers or conductive polymer fibers dispersed on the transparent resin layer can implement the authentication process to make it difficult to hacking due to dual security system.

The present invention has an advantageous effect in that authentication process can be implemented by integrated technologies of chip RFID and chipless RFID.

The present invention has an advantageous effect in that the RFID cap is formed with metal fibers or conductive polymer fibers, whereby the chipless RFID technology can read out information from the metal fibers or conductive polymer fibers.

The present invention has an advantageous effect in that the RFID cap is formed with a printing layer dispersed with metal fibers or conductive polymer fibers, whereby information contained in the metal fibers or conductive polymer fibers can be detected by the chipless RFID.

The present invention has an advantageous effect in that a container embedded with contents is manufactured using RFID cap, whereby information such as manufacturing information can be easily read out by the chipless RFID technology to conveniently manage information such as distribution routes after manufacturing and manufacturing process history.

The RFID can according to the present invention has an advantageous effect in that the RFID can is formed with a coating layer dispersed with metal fibers or conductive polymer fibers, and information can be read out from the metal fibers or conductive polymer fibers dispersed on the coating layer using the RFID technology.

The present invention has an advantageous effect in that the can cap or can lid is formed with a printing layer dispersed with metal fibers or conductive polymer fibers, and information contained in the metal fibers or conductive polymer fibers can be detected by the chipless RFID.

The present invention has an advantageous effect in that the RFID can be manufactured and information such as manufacturing information can be easily read out by the chipless RFID technology, whereby various information such as distribution routes after manufacturing and manufacturing process history can be conveniently managed.

The packaging material for chipless RFID according to the present invention has an advantageous effect in that metal fibers or conductive polymer fibers are respectively dispersed on the transparent resin layer and transparent resin film, whereby an intrinsic value such as ID is provided by patterns of metal fibers or conductive polymer fibers made by the transparent resin layer and transparent resin film to make it more difficult to hack, whereby a stronger security can be maintained.

The present invention has an advantageous effect in that products are packaged with packaging material for chipless RFID, whereby information such as packaging information can be easily read out by the chipless RFID technology, such that various management can be conveniently implemented after the packaging.

The certificate for chipless RFID according to the present invention has an advantageous effect in that the certificate is equipped with a transparent resin layer and a certificate code printing layer dispersed with metal fibers or conductive polymer fibers to match the ID detected by the metal fibers or conductive polymer fibers dispersed on the transparent resin layer to the ID detected by the certificate code printing layer, whereby a more accurate authentication can be implemented to enhance reliability of the certificate.

The present invention has an advantageous effect in that the certificate for chipless RFID is equipped with a transparent resin layer dispersed with metal fibers or conductive polymer fibers, whereby an intrinsic value such as ID of the certificate can be detected by a reader to implement the chipless RFID technology.

The certificate for chipless RFID according to the present invention has an advantageous effect in that a transparent resin layer dispersed with metal fibers or conductive polymer fibers is printed on a hologram film, whereby image colors can be changed according to viewing angle, and image shapes can be changed according to an angle viewed by the metal fibers or conductive polymer fibers to thereby provide an intrinsicality.

BEST MODE FOR CARRYING OUT THE INVENTION

Figure 1:
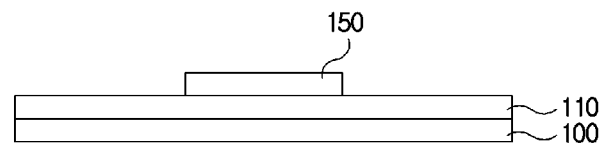
FIG. 1 is a schematic view illustrating a chipless RFID structure changing colors according to temperatures according to a first exemplary embodiment of the present invention.

Exemplary embodiments of the present invention will be described in detail with reference to the accompanying drawings. Like reference numerals refer to like parts or portions throughout the description of several views of the drawings. Detailed descriptions of well-known functions, configurations or constructions are omitted for brevity and clarity so as not to obscure the description of the present invention with unnecessary detail.

First Aspect of the Present Invention

FIG. 1 is a schematic view illustrating a chipless RFID (Radio Frequency IDentification) structure changing colors according to temperatures according to a first exemplary embodiment of the present invention.

The chipless RFID (Radio Frequency IDentification) structure changing colors according to temperatures according to a first exemplary embodiment of the present invention may include a transparent resin film (100), a transparent resin layer (110) printed on an upper surface of the transparent resin film (100) and dispersed with metal fibers or conductive polymer fibers, and a thermochromic dye printing layer (150) printed on an upper surface of the transparent resin layer (110).

In the chipless RFID (Radio Frequency IDentification) structure changing colors according to temperatures according to a first exemplary embodiment of the present invention, the transparent resin layer (110) dispersed with metal fibers or conductive polymer fibers is formed by being printed on an upper surface of the transparent resin film (100).

At this time, whenever the transparent resin layer (110) dispersed with metal fibers or conductive polymer fibers is printed on an upper surface of the transparent resin film (100), patterns made by metal fibers or conductive polymer fibers dispersed in the printed transparent resin layer differ.

Figure 2:
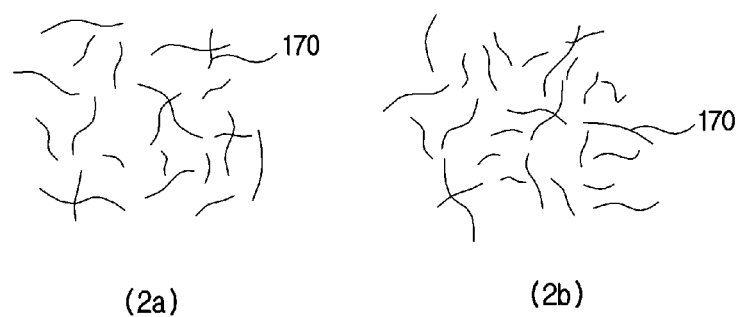
FIGS. 2a and 2b are a schematic view illustrating a pattern of metal fibers or conductive polymer fibers dispersed on a transparent resin layer of a chipless RFID changing colors according to temperature according to the present invention.

That is, prior to the transparent resin layer (110) being printed, the metal fibers or conductive polymer fibers are dispersed in a transparent liquefied resin, and randomly fixed/positioned at the transparent resin layer. Therefore, as illustrated in FIGS. 2a and 2b, the patterns made by the metal fibers or conductive polymer fibers on the printed transparent resin layer are mutually different. As a result, the chipless RFID (Radio Frequency IDentification) structure changing colors according to temperatures is such that the pattern made by the metal fibers or conductive polymer fibers dispersed on the transparent resin layer becomes a unique pattern with an intrinsic value to be advantageously utilized for RFID. Furthermore, the RFID structure according to a first exemplary embodiment of the present invention is a chipless RFID having no chips.

For example, in a case a reader irradiates microwave to the transparent resin layer (110) dispersed with metal fibers or conductive polymer fibers, a reflective wave having a particular waveform is generated from the metal fibers or conductive polymer fibers, and the reader detects the reflective wave to recognize an intrinsic value like an ID contained in the metal fibers or conductive polymer fibers dispersed on the transparent resin layer (110).

In addition, the chipless RFID (Radio Frequency IDentification) structure changing colors according to temperatures according to the first exemplary embodiment of the present invention is formed with a thermochromic dye printing layer (150), whereby changes of colors according to temperatures can be recognized.

Therefore, the RFID structure according to the present invention may be advantageously attached to a food product group that determines freshness and taste according to colors to recognize a temperature state of the food product group.

The present invention has an advantageous effect in that a transparent resin layer dispersed with metal fibers or conductive polymer fibers is formed to detect an intrinsic value such as an ID using a reader, whereby a technique of chipless RFID can be implemented.

Figure 3:
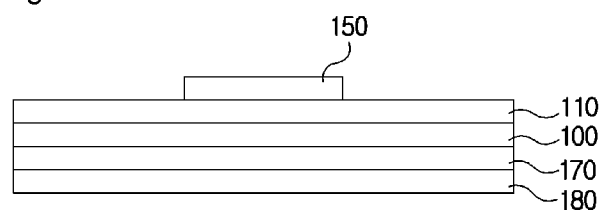
FIG. 3 is a schematic cross-sectional view illustrating a state in which a release paper is attached to a chipless RFID structure changing colors according to temperature according to a first exemplary embodiment of the present invention.

FIG. 3 is a schematic cross-sectional view illustrating a state in which a release paper is attached to a chipless RFID structure changing colors according to temperature according to a first exemplary embodiment of the present invention.

The chipless RFID structure changing colors according to temperature according to a first exemplary embodiment of the present invention may be attached with a release paper underneath the transparent resin film to be utilized in the form of a sticker. That is, as shown in FIG. 3, an adhesive layer (170) and a release paper (180) may be sequentially formed underneath the transparent resin film (100).

Figure 4:
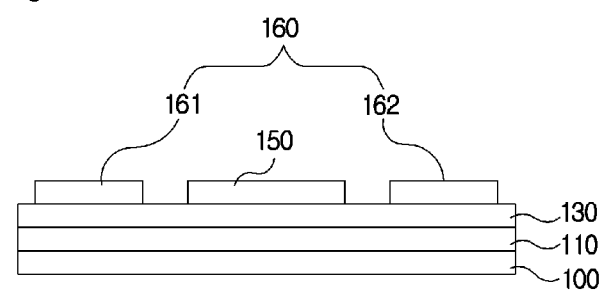
FIG. 4 is a schematic cross-sectional view illustrating a chipless RFID structure changing colors according to temperature according to a second exemplary embodiment of the present invention.

FIG. 4 is a schematic cross-sectional view illustrating a chipless RFID structure changing colors according to temperatures according to a second exemplary embodiment of the present invention.

The chipless RFID structure changing colors according to temperature may include a transparent resin film (100), a transparent resin layer (110) printed on an upper surface of the transparent resin film (100) and dispersed with metal fibers or conductive polymer fibers, a transmissive resin layer (130) printed on an upper surface of the transparent resin layer (110), a thermochromic dye printing layer (150) printed on a partial upper area of the transmissive resin layer (130), and an added information printing layer (160) printed on a remaining upper area of the transmissive resin layer (130).

In FIG. 4, the thermochromic dye printing layer (150) is formed at a central upper surface of the transmissive resin layer (130), and the added information printing layer (160) includes a first added information printing layer (161) formed an upper area of the transmissive resin layer (130) at the left hand side of the transmissive resin layer (130), and a second added information printing layer (162) formed an upper area of the transmissive resin layer (130) at the right hand side of the transmissive resin layer (130).

The added information printing layer (160) is a printed layer on which identification codes are printed, the identification codes including, but not limited thereto, product information, product advertisement and bar codes attached with the chipless RFID structure changing colors according to temperatures.

Figure 5:
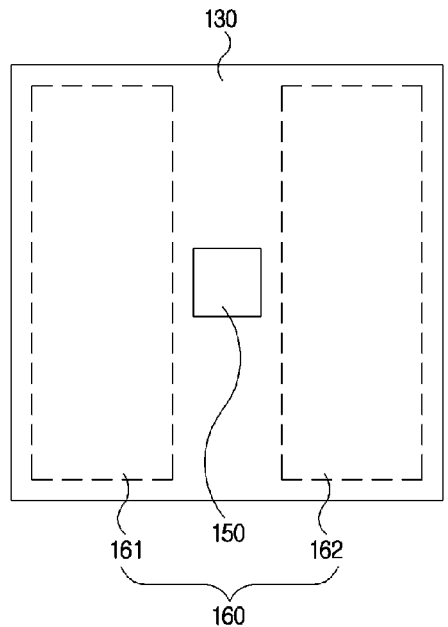
FIG. 5 is a schematic view of an upper surface illustrating a chipless RFID structure changing colors according to temperature according to a second exemplary embodiment of the present invention.

FIG. 5 is a schematic view of an upper surface illustrating a chipless RFID structure changing colors according to temperature according to a second exemplary embodiment of the present invention.

The transmissive resin layer (130) of RFID structure is printed with the thermochromic dye printing layer (150). The thermochromic dye printing layer (150) is intended to recognize a temperature status of a product, and may be allotted with a small area of the transmissive resin layer (130). An area not formed with the thermochromic dye printing layer (150) is formed with the added information printing layer (160) for displaying added information for the product.

Figure 6:
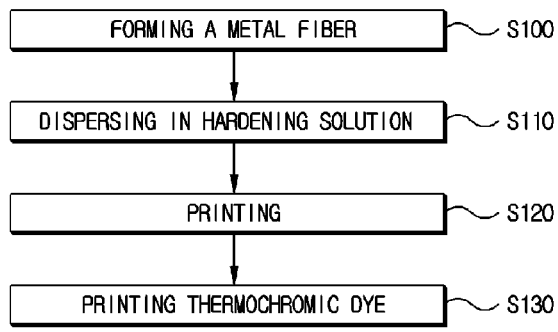
FIG. 6 is a schematic flowchart illustrating a method for fabricating a chipless RFID structure changing colors according to temperature according to the present invention.

FIG. 6 is a schematic flowchart illustrating a method for fabricating a chipless RFID structure changing colors according to temperature according to the present invention.

First, metal fibers or conductive polymer fibers are formed (S100). The metal fibers or conductive polymer fibers may be formed by metal-coating textile fibers or by grinding metal body. That is, each of the metal fibers or the conductive polymer fibers may include a textile fiber, and a metal layer coated with the textile fiber or a conductive polymer layer, or a metal fiber of a single material, or conductive polymer fibers.

Successively, the metal fibers or conductive polymer fibers are dispersed on hardening solution (S110). Then, the hardening solution dispersed with metal fibers or conductive polymer fibers, and including transparent resin is printed on an upper surface of the transparent resin film (S120). The material of the transparent resin film may include one of a group consisting of PET (Poly Ethylene Terephthalate), PE (Poly Ethylene) and PVE (Poly Vinyl Chloride).

Thereafter, the hardening solution dispersed with printed metal fibers or conductive polymer fibers is hardened to form a transparent resin layer dispersed with metal fibers or conductive polymer fibers. Then, the thermochromic dye printing layer (150) is formed on an upper surface of the hardened transparent resin layer (S130).

FIGS. 7a, 7b and 7c are schematic views illustrating a state in which metal fibers or conductive polymer fibers according to the present invention are dispersed. Each of the metal fibers or the conductive polymer fibers may take the shape of a length longer than a thickness, as illustrated in FIG. 7a, or with at least one curvature, as illustrated in FIG. 7b, Furthermore, Each of the metal fibers or the conductive polymer fibers may be alternatively dispersed on the transparent resin layer, as illustrated in FIG. 7c.

Second Aspect of the Present Invention

Figure 8:
FIG. 8 is a schematic cross-sectional view illustrating a stacked film for preventing forgery according to a first exemplary embodiment of the present invention.

FIG. 8 is a schematic cross-sectional view illustrating a stacked film for preventing forgery according to a first exemplary embodiment of the present invention.

Figure 9:
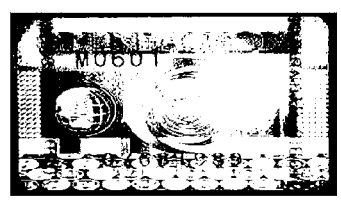
FIG. 9 is an exemplary photograph for illustrating a stacked film for preventing forgery according to the present invention.

A stacked film for preventing forgery according to the first exemplary embodiment of the present invention may include a hologram film (200) configured to change an image color in response to a reflection angle of incident light or a refractive angle; and a transparent resin layer (210) printed with the hologram film and dispersed with metal fibers or conductive polymer fibers. The stacked film for preventing forgery according to the first exemplary embodiment of the present invention is embedded with the hologram film (200) configured to change an image color in response to a reflection angle of incident light or a refractive angle, such that an image of the hologram film (200) can be viewed as shown in FIG. 9. The metal fibers or the conductive polymer fibers may include stainless steel fibers.

Figure 10:
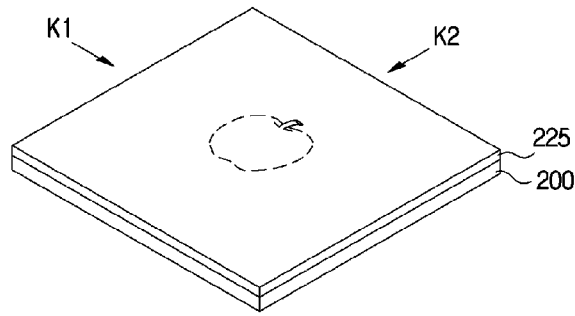
FIG. 10 is a schematic perspective view illustrating a state of an image of a stacked film for preventing forgery viewed in different angles according to the present invention.
Figure 11:
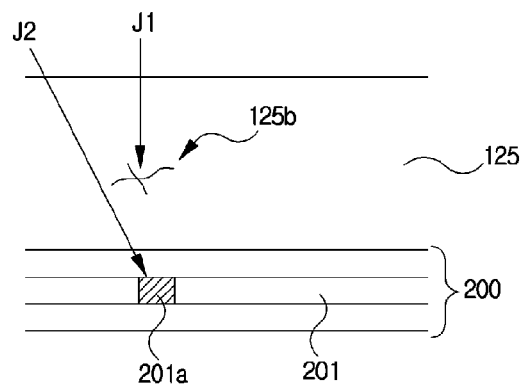
FIG. 11 is a schematic perspective view illustrating an occurrence of deformation of an image of a stacked film for preventing forgery by dispersed metal fibers according to the present invention.

FIG. 10 is a schematic perspective view illustrating a state of an image of a stacked film for preventing forgery viewed in different angles according to the present invention, and FIG. 11 is a schematic perspective view illustrating an occurrence of deformation of an image of a stacked film for preventing forgery by dispersed metal fibers according to the present invention.

First, the stacked film for preventing forgery can change image colors in response to viewing angle. That is, as shown in FIG. 10, a color viewed from a direction (K1) of a first angle is different from that viewed from a direction (K2) of a second angle according to the stacked film for preventing forgery. Furthermore, although the transparent resin layer (225) printed on the hologram film (200) has no problem in viewing the image of the hologram film (200), the metal fibers or conductive polymer fibers dispersed on the transparent resin layer (225) may conceal an image of the hologram film (200) according to viewing angles.

That is, as shown in FIG. 11, in a case the stacked film for preventing forgery is viewed from a first direction (J1), a particular area (201a) of an image (201) inside to hologram film (200) may be concealed by metal fibers (225a) dispersed on the transparent resin layer (225) and cannot be viewed.

Alternatively, in a case the stacked film for preventing forgery is viewed from a second direction (J2) different from the first direction (J1), the particular area (201a) of an image (201) inside the hologram film (200) may be viewed. Therefore, the metal fibers or conductive polymer fibers dispersed on the transparent resin layer (225) may conceal the image of the hologram film (200) to change an image shape according to viewing angle, and provide an intrinsicality to the image of the hologram film (200).

Therefore, the stacked film for preventing forgery according to the present invention has an advantageous effect in that a transparent resin layer dispersed with metal fibers or conductive polymer fibers is printed on a hologram film to change colors of an image according to viewing angles, and to change an image shape according to an angle viewed by the metal fibers or the conductive polymer fibers, whereby an intrinsicality can be provided. In a nutshell, the film structure according to the present invention can be utilized for prevention of forgery and counterfeit.

Figure 12:
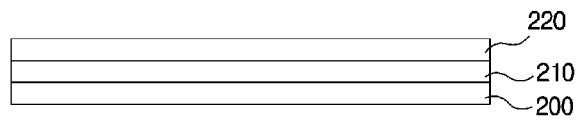
FIG. 12 is a schematic cross-sectional view illustrating a stacked film for preventing forgery according to a second exemplary embodiment of the present invention.
Figure 13:
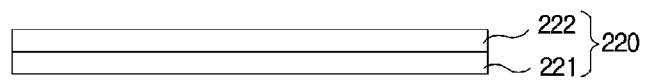
FIG. 13 is a schematic cross-sectional view illustrating a transparent resin film dispersed with metal fibers or conductive polymer fibers according to a second exemplary embodiment of the present invention.

FIG. 12 is a schematic cross-sectional view illustrating a stacked film for preventing forgery according to a second exemplary embodiment of the present invention.

The stacked film for preventing forgery according to a second exemplary embodiment of the present invention may include a hologram film (200) configured to change an image color in response to a reflection angle of incident light or a refractive angle, and a transparent resin layer (220) adhered to an upper surface of the hologram film (200) and dispersed with metal fibers or conductive polymer fibers. Therefore, an adhesive layer (210) may be formed between the hologram film (200) and the transparent resin layer (220).

Therefore, the stacked film for preventing forgery according to the first exemplary embodiment of the present invention is such that the hologram film (200) is printed with the transparent resin layer (225) dispersed with metal fibers or conductive polymer fibers, whereas the stacked film for preventing forgery according to the second exemplary embodiment of the present invention is such that the transparent resin film (220) dispersed with the prepared metal fibers or conductive polymer fibers is adhered to an upper surface of the hologram film (200).

Figure 7:
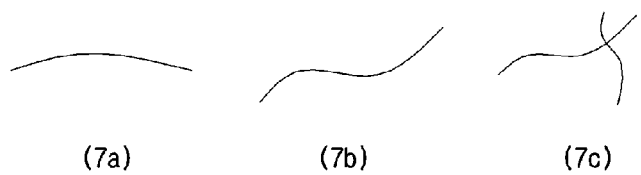
FIGS. 7a, 7b and 7c are schematic views illustrating a state in which metal fibers or conductive polymer fibers according to the present invention are dispersed.

At this time, the transparent resin film (220) dispersed with metal fibers or conductive polymer fibers may include a transparent resin film (221), and a transparent resin layer (222) printed on an upper surface of the transparent resin film (221) and dispersed with metal fibers or conductive polymer fibers, as illustrated in FIG. 7. The material of the transparent resin film (221) may include one of a group consisting of PET (Poly Ethylene Terephthalate), PE (Poly Ethylene) and PVE (Poly Vinyl Chloride).

Figure 14:
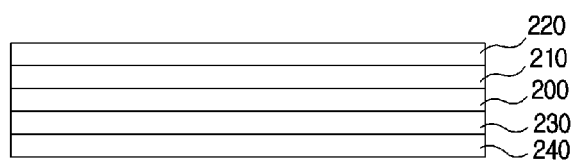
FIG. 14 is a schematic cross-sectional view illustrating a state in which a release paper is adhered to a stacked film for preventing forgery according to a second exemplary embodiment of the present invention.

Meanwhile, the stacked film for preventing forgery according to the exemplary embodiments of the present invention may be utilized in the form of a sticker by being adhered by a release paper underneath the hologram film. That is, as illustrated in FIG. 14, the hologram film (200) of the stacked film for preventing forgery according to the second exemplary embodiment of the present invention may be sequentially formed thereunder with an adhesive layer and a release paper.

Figure 15:
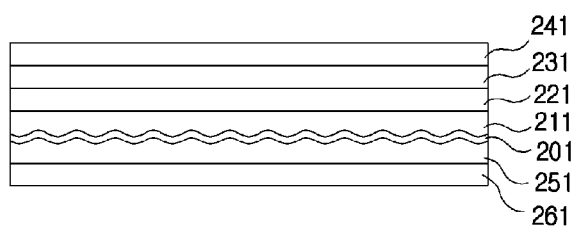
FIG. 15 is a schematic cross-sectional view illustrating a stacked film for preventing forgery according to a third exemplary embodiment of the present invention.
Figure 16:
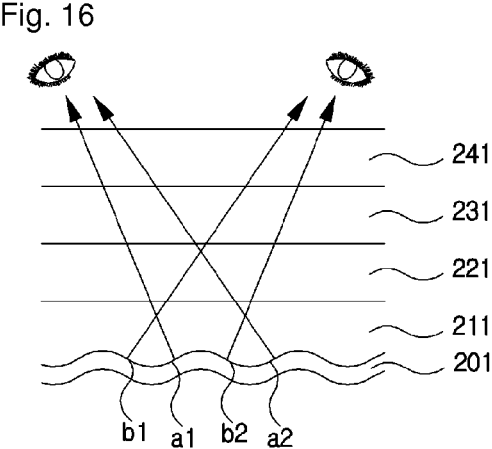
FIG. 16 is a schematic cross-sectional view illustrating an image of a stacked film for preventing forgery changing colors according to viewing angles according to a third exemplary embodiment of the present invention.

FIG. 15 is a schematic cross-sectional view illustrating a stacked film for preventing forgery according to a third exemplary embodiment of the present invention, and FIG. 16 is a schematic cross-sectional view illustrating an image of a stacked film for preventing forgery changing colors according to viewing angles according to a third exemplary embodiment of the present invention.

The stacked film for preventing forgery according to the third exemplary embodiment of the present invention may include an embossed reflection plate (210), a transmissive resin layer (211) formed on an upper surface of the reflection plate (210), a transparent resin layer (221) printed on an upper surface of the transmissive resin layer (211) and dispersed with metal fibers or conductive polymer fibers, a resin layer (231) formed on an upper surface of the transmissive resin layer and formed with an image, and a surface resin layer (241) formed on an upper surface of the image-formed resin layer (231). The reflection plate (201) may be adhered thereunder by an adhesive layer (251) and a release paper (261) to be utilized in the form of a sticker.

The stacked film for preventing forgery according to the third exemplary embodiment of the present invention is such that the hologram film is formed therein with transparent resin layer (221) dispersed with metal fibers or conductive polymer fibers. The stacked film for preventing forgery according to the third exemplary embodiment of the present invention is such that light incident from the surface resin layer (241) is reflected from the embossed reflection plate (201) to change image colors according to the viewing angle.

That is, an image viewed from light reflected from a curvature of 'a1' and 'a2' of the reflection plate (201) through the image-formed resin layer (231) is an image viewed from the left hand side of FIG. 16, and an image viewed from light reflected from a curvature of 'b1' and 'b2' of the reflection plate (201) through the image-formed resin layer (231) is an image viewed from the right hand side of FIG. 16, such that image color is changed by the different light paths.

Figure 17:
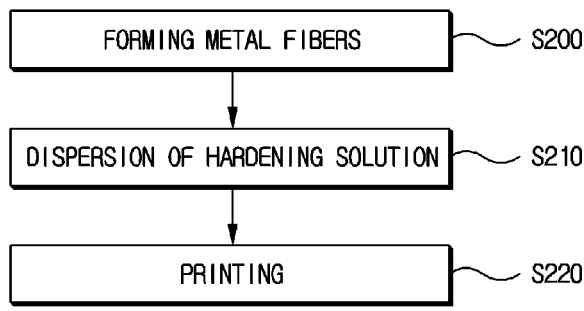
FIG. 17 is a schematic flowchart illustrating a method for fabricating a stacked film for preventing forgery according to the present invention.

FIG. 17 is a schematic flowchart illustrating a method for fabricating a stacked film for preventing forgery according to the present invention.

First, metal fibers or conductive polymer fibers are formed (S200). The metal fibers or conductive polymer fibers may be formed by metal or conductive polymer-coating or by grinding metal body or conductive polymer body. That is, each of the metal fibers or the conductive polymer fibers may include a textile fiber, and a metal layer coated with the textile fiber or a conductive polymer layer, or a metal fiber of a single material, or conductive polymer fibers.

Successively, the metal fibers or conductive polymer fibers are dispersed on hardening solution (S210). Then, the hardening solution dispersed with metal fibers or conductive polymer fibers, and including transparent resin is printed on the hologram film changing image colors in response to reflection angle or refractive angle of incident light (S220). Thereafter, the hardening solution dispersed with the printed metal fibers or conductive polymer fibers is hardened to form a transparent resin layer dispersed with the printed metal fibers or conductive polymer fibers.

MODE FOR THE INVENTION

Third Aspect of the Present Invention

Figure 18:
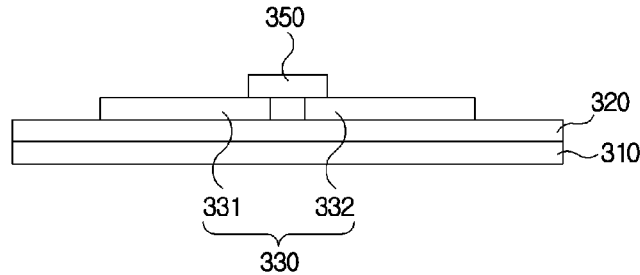
FIG. 18 is a schematic cross-sectional view illustrating an RFID tag according to an exemplary embodiment of the present invention.

FIG. 18 is a schematic cross-sectional view illustrating an RFID tag according to an exemplary embodiment of the present invention.

The RFID tag according to an exemplary embodiment of the present invention may include a base film (310), a transparent resin layer (320) printed on an upper surface of the base film (310) and dispersed with metal fibers or conductive polymer fibers, an antenna (330) formed on an upper surface of the transparent resin layer (320), and a tag chip (350) connected to the antenna (330). The antenna (330) may be formed by printing a conductive paste on an upper surface of the transparent resin layer (320).

The antenna (330) may be a single-structured monopole antenna or a dual-structured dipole antennas (331, 332) as shown in FIG. 1.

The RFID tag according to exemplary embodiment of the present invention is such that IDs can be recognized by metal fibers or conductive polymer fibers dispersed on the transparent resin layer (320), and the tag chip (350).

Therefore, the present invention has an advantageous effect in that one tag can be provided with two IDs, whereby the two IDs can implement a more accurate authentication.

The present invention has an advantageous effect in that even if one ID provided on a tag chip is hacked, another ID provided on the metal fibers or conductive polymer fibers dispersed on the transparent resin layer can implement the authentication process to make it difficult to hacking due to dual security system. That is, the present invention has an advantageous effect in that hacking may be determined by presence or absence of metal fibers or conductive polymer fibers dispersed on the transparent resin layer (320).

Furthermore, even if the metal fibers or conductive polymer fibers dispersed on the transparent resin layer (320) are present, and if the provided ID is not a proper ID, the present invention may determine that the provided ID is not a subject of authentication. Still furthermore, even if the provided ID is a proper ID to be a subject of authentication, and if the provided ID is not matched, the present invention may determine that the provided ID is not a subject of authentication. The material of the metal fibers may include stainless steel fibers.

Meanwhile, the RFID tag according to the present invention is formed with the transparent resin layer (320) dispersed with metal fibers or conductive polymer fibers by which an ID is read out, such that the authentication process can be implemented using the technology of the chipless RFID.

For example, in a case millimeter wave is irradiated from the reader to the transparent resin layer (320) dispersed with metal fibers or conductive polymer fibers, a particular waveform of reflection wave is generated from the metal fibers or conductive polymer fibers, and the reader can detect the reflection wave to detect an intrinsic ID contained in the metal fibers or conductive polymer fibers dispersed on the transparent resin layer (320).

Therefore, as the chipless RFID tag according to the present invention is equipped with the transparent resin layer dispersed with metal fibers or conductive polymer fibers, the intrinsic value and contained information such as ID (Identification) can be detected using the dispersed patterns of the metal fibers or conductive polymer fibers, whereby the chipless RFID technology can be advantageously implemented. Furthermore, the authentication process of the tag chip (350) is implemented by the chipless RFID technology.

Therefore, the RFID tag according to the present invention is advantageous in that the authentication can be implemented by a combined use of technology of the chip RFID and the chipless RFID.

Figure 19:
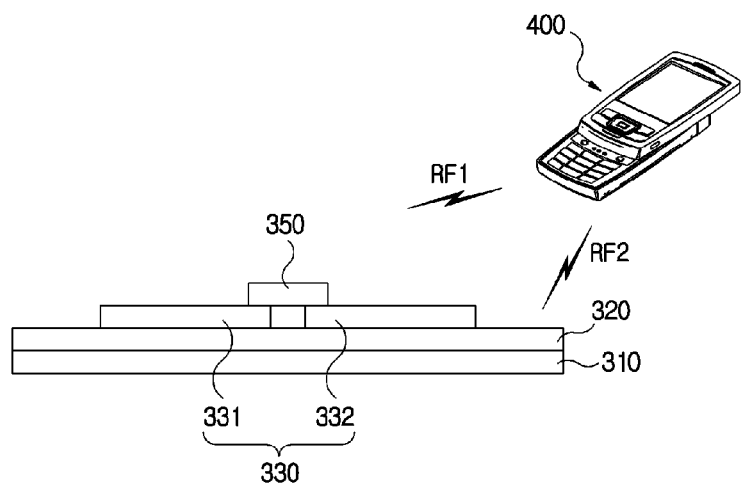
FIG. 19 is a schematic view illustrating an RFID system formed with RFID tag according to an exemplary embodiment of the present invention.

FIG. 19 is a schematic view illustrating an RFID system formed with RFID tag according to an exemplary embodiment of the present invention.

The RFID system according to an exemplary embodiment of the present invention may include a RFID tag including a base film (310), a transparent resin layer (320) printed on an upper surface of the base film (310) and dispersed with metal fibers or conductive polymer fibers, an antenna (330) formed on an upper surface of the transparent resin layer (320), and an RFID tag including a tag chip (350) connected to the antenna (330); and a terminal (400) including a reader capable of recognizing a first identification (ID) by the tag chip (350) of the RFID tag, and capable of recognizing a second identification (ID) by the metal fibers or conductive polymer fibers dispersed on the transparent resin layer.

The terminal (400) may be formed with a reader capable of recognizing a first identification (ID) by the tag chip (350) of the RFID tag, and capable of recognizing a second identification (ID) by the metal fibers or conductive polymer fibers dispersed on the transparent resin layer. That is, the terminal (400) formed with the reader receives a first RF signal (RF1) transmitted from the antenna (330) connected to the tag chip (350) and a second RF signal (RF2) reflected from the metal fibers or conductive polymer fibers dispersed on the transparent resin layer (320) to allow the reader to recognize the first ID and the second ID. The terminal may include a portable terminal such as a mobile phone, a notebook, a PMP and an MP3.

Figure 20:
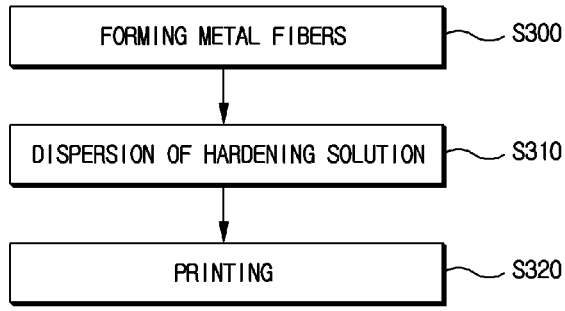
FIG. 20 is a schematic flowchart illustrating a method for forming a transparent resin layer dispersed with metal fibers or conductive polymer fibers according to the present invention.

FIG. 20 is a schematic flowchart illustrating a method for forming a transparent resin layer dispersed with metal fibers or conductive polymer fibers according to the present invention.

First, metal fibers or conductive polymer fibers are formed (S300).

Successively, the metal fibers or conductive polymer fibers are dispersed on hardening solution (S310), where the hardening transparent resin is a transparent resin capable of printing and hardening. The hardening transparent resin dispersed with metal fibers or conductive polymer fibers is printed (S320). Then, the printed hardening transparent resin dispersed with metal fibers or conductive polymer fibers is hardened to form a transparent resin layer dispersed with metal fibers or conductive polymer fibers.

Figure 21:
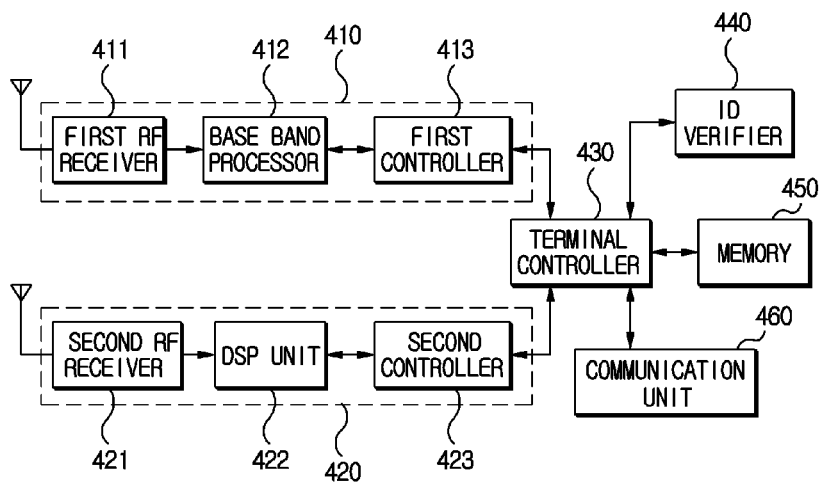
FIG. 21 is a schematic block diagram of a terminal equipped with a reader recognizing an RFID tag according to an exemplary embodiment of the present invention.

FIG. 21 is a schematic block diagram of a terminal equipped with a reader recognizing an RFID tag according to an exemplary embodiment of the present invention.

As mentioned above, the terminal is formed with a reader capable of recognizing the RFID tag. The reader capable of recognizing the RFID tag may include a UHF (Ultra High Frequency) reader module (410) configured to receive a first RF (Radio Frequency) signal transmitted by the antenna connected to the tag chip and to recognize the first ID; and a chipless reader module (420) configured to receive a second RF signal reflected from the metal fibers or conductive polymer fibers dispersed on an upper surface of the transparent resin layer to recognize the second ID.

The UHF reader module (410) may include a first RF receiver (411) configured to receive a first RF signal transmitted from an antenna connected to the tag chip; a BB (Base Band) processor (412) configured to convert the first RF signal received by the first RF receiver (411) to a BB signal; and a first controller (413) configured to detect a first ID using the BB signal converted by the BB processor (412).

The chipless reader module (420) may include a second RF receiver (421) configured to receive a second RF signal reflected by metal fibers or conductive polymer fibers dispersed on the transparent resin layer; a DSP (Digital Signal Processor. 422) configured to digital-signal-process the second RF signal received by the second RF receiver (421); and a second controller (423) configured to detect a second ID using the signal digitally processed by the DSP (422).

Therefore, the UHF reader module (410) can recognize the first ID by receiving the first RF signal transmitted from the antenna connected to the tag chip, and the chipless reader module (420) can recognize the second ID by receiving the second RF signal reflected by the metal fibers or conductive polymer fibers dispersed on the transparent resin layer. Furthermore the terminal may include an ID verifier (440) configured to verify matching between the first ID recognized by the UHF reader module (410) and the second ID recognized by the chipless reader module (420).

That is, a signal to the first ID detected by the first controller (413) of the UHF reader module (410) and to the second ID detected by the second controller of the chipless reader module (420) is inputted to a controller terminal controller (430) controlling the terminal, where the terminal controller (430) drives the ID verifier (440) to verify the matching between the first ID and the second ID. Furthermore, the ID verifier (440) may output a signal of a matching result between the first ID and the second ID to the terminal controller (430) to confirm the authentication or non-authentication of the RFID tag.

In a case the verification of the RFID tag is confirmed by the terminal controller (430), an ID provided to the RFID tag is transmitted to a remote server through a communication unit (460). At this time, the ID transmitted to the communication unit (460) may be identical to or different from the first ID or the second ID. As a result of the verification of matching between the first ID and the second ID, if it is verified that the first ID and the second ID are matched, the ID verifier (440) may perform various calculation processes using the first ID and/or second ID to generate an ID. The ID thus generated by the ID verifier (440) is transmitted from the communication unit to the server through the terminal controller (430).

The communication between the communication unit (460) of the terminal and the server may be implemented on a wired or wireless communication network through a wired or wireless data communication. Furthermore, the UHF reader module (410) and the chipless reader module (420) may detect not only the ID but information contained in the RFID tag. Still furthermore, the terminal may include a memory (450) capable of storing the ID and the information detected by the UHF reader module (410) and the chipless reader module (420).

Figure 23:
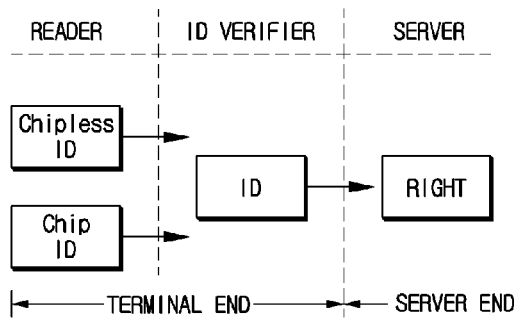
FIG. 23 is a conceptual view illustrating an example of issuing added information by an RFID system according to an exemplary embodiment of the present invention.

Meanwhile, the RFID system according to the exemplary embodiment of the present invention may include a server configured to determine a right capable of issuing added information by receiving an ID from the terminal, and to issue the added information to the terminal if there is the right capable of issuing the added information. At this time, the case the terminal transmits the ID to the server is a time when the first ID and the second ID are matched by the ID verifier (440). That is, the RFID system includes a reader and an ID verifier at the terminal end as shown in FIG. 23. Therefore, the chipless reader module of the reader detects a chipless ID, the UHF reader module of the reader detects a tag chip ID, and the ID verifier verifies the matching between the chipless ID and the tag chip ID to generate a new ID. The server receives the ID generated by the ID verifier to determine a right and issues added information to the terminal end if there is the right.

Figure 22:
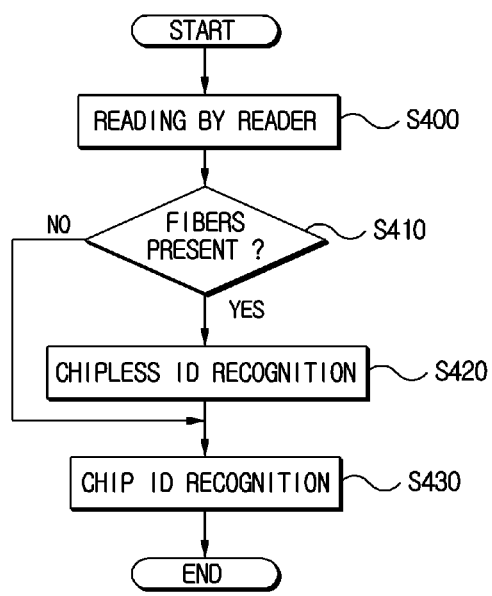
FIG. 22 is a flowchart illustrating a method for controlling an RFID system according to an exemplary embodiment of the present invention.

FIG. 22 is a flowchart illustrating a method for controlling an RFID system according to an exemplary embodiment of the present invention.

First, an RFID tag is read out by a reader of a terminal (S400). Determination is made as to whether metal fibers or conductive polymer fibers are present on the RFID tag as a result of reading by the reader of the terminal (S410). Then recognition of an ID contained in the metal fibers or the conductive polymer fibers of the RFID tag is made, if it is determined as a result of reading by the reader of the terminal that metal fibers or conductive polymer fibers are present on the RFID tag (S420), where the ID contained in the metal fibers or the conductive polymer fibers of the RFID tag is a chipless ID. Successively, the ID contained in the tag chip of the RFID tag is recognized (S430).

Figure 24:
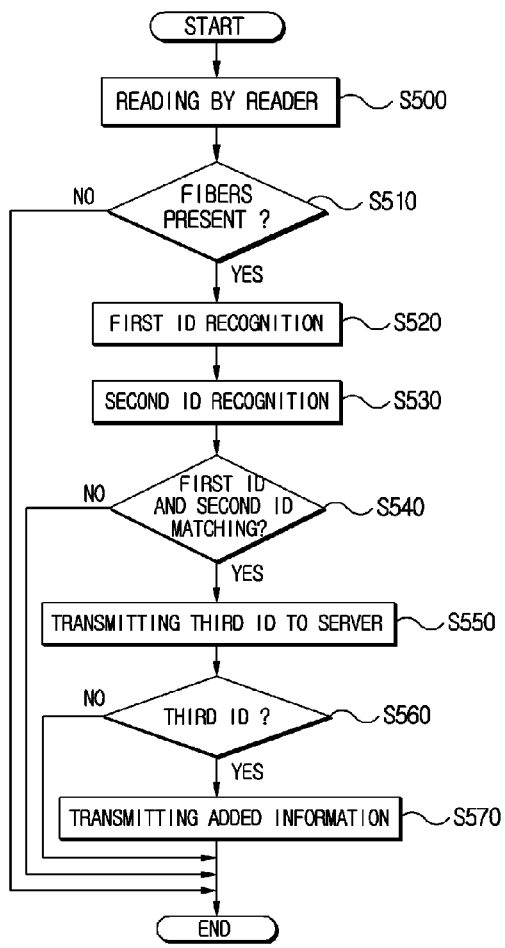
FIG. 24 is a flowchart illustrating another method for controlling an RFID system according to an exemplary embodiment of the present invention.

FIG. 24 is a flowchart illustrating another method for controlling an RFID system according to an exemplary embodiment of the present invention.

The method for controlling the RFID system may implement a more accurate authentication by verifying a matching between the first ID recognized by the UHF reader module and the second ID recognized by the chipless reader module using the ID verifier of the terminal.

That is, the method may include reading an RFID tag using a reader of a terminal (S500), determining whether metal fibers or conductive polymer fibers are present on the RFID tag as a result of reading by the reader of the terminal (S510), recognizing a first ID contained in the metal fibers or the conductive polymer fibers of the RFID tag, if it is determined as a result of reading by the reader of the terminal that metal fibers or conductive polymer fibers are present on the RFID tag (S520), recognizing a second ID contained in the tag chip of the RFID tag (S530), determining whether the first ID and the second ID are matched (S540), transmitting a third ID to a server including added information, if the first ID and the second ID are matched (550), where the third ID may be used as the first ID or the second ID, and may be an ID generated by implementing various calculation processes using the first ID and/or the second ID, determining whether the third ID received by the server has a right to issue added information (S560), where the step of S560 is to determine whether the third ID is a legal ID capable of downloading the added information of the sever, and to determine an appropriateness of the ID and effectiveness (effective date) of ID and to determine whether the third ID has a right to be issued with the added information, and transmitting and issuing, by the server, the added information to the terminal to complete the issuance, if the third ID received by the server has the right to be issued with the added information (S570).

Fourth Aspect of the Present Invention

Figure 25:
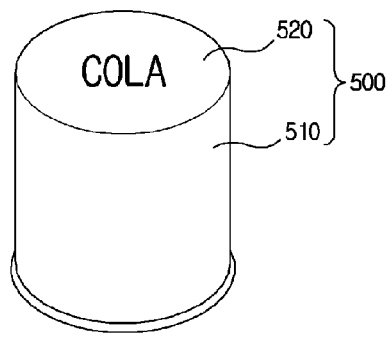
FIG. 25 is a schematic cross-sectional view illustrating an RFID cap according to a first exemplary embodiment of the present invention.

FIG. 25 is a schematic cross-sectional view illustrating an RFID cap (500) according to a first exemplary embodiment of the present invention.

The RFID cap (500) according to the first exemplary embodiment of the present invention may include a cap molding structure (510) dispersed with metal fibers or conductive polymer fibers, and a label printing layer (520) printed on an upper surface of the cap molding structure (510).

The RFID cap (500) may disperse the metal fibers or the conductive polymer fibers in a molding resin, and molds a cap shape using the molding resin dispersed with metal fibers or conductive polymer fibers to manufacture a cap molding structure (510). At this time, the RFID cap (500) may be applied to all types of caps capable of tightly sealing an upper part of a container such as a beverage bottle.

Therefore, the RFID cap (500) according to the first exemplary embodiment of the present invention is advantageously formed with the cap molding structure (510) dispersed with metal fibers or conductive polymer fibers to read out information from the metal fibers or conductive polymer fibers dispersed on the cap molding structure (510).

That is, patterns of the metal fibers or conductive polymer fibers dispersed on the cap molding structure (510) can have intrinsic value to record information on the patterns of the metal fibers or conductive polymer fibers.

Therefore, the RFID cap (500) according to the first exemplary embodiment of the present invention can read out the information recorded on the patterns of the dispersed metal fibers or conductive polymer fibers using the chipless RFID technology.

For example, in a case the reader irradiates millimeter wave to the RFID cap, a particular waveform of reflective wave is generated from the metal fibers or conductive polymer fibers dispersed on the cap molding structure (510) of the RFID cap, and the reader detects the reflective wave to detect the information recorded in the metal fibers or conductive polymer fibers.

Meanwhile, the information recorded in the metal fibers or conductive polymer fibers dispersed on the cap molding structure (500) may include all information including, but not limited thereto, a time of a cap closed after contents of a beverage bottle or vessel is poured, information on distribution period and price.

Figure 26:
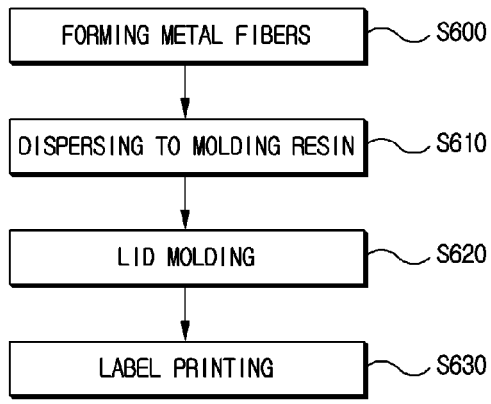
FIG. 26 is a schematic flowchart illustrating an example of a method for manufacturing an RFID cap according to a first exemplary embodiment of the present invention.

FIG. 26 is a schematic flowchart illustrating an example of a method for manufacturing an RFID cap according to a first exemplary embodiment of the present invention.

First, metal fibers or conductive polymer fibers are formed (S600).

Successively, the metal fibers or conductive polymer fibers are dispersed on transparent molding resin (S610). Successively, the transparent molding resin dispersed with metal fibers or conductive polymer fibers is molded to form a cap molding structure dispersed with metal fibers or conductive polymer fibers (S620). Then, the cap molding structure is printed thereon with a label (S630).

Figure 27:
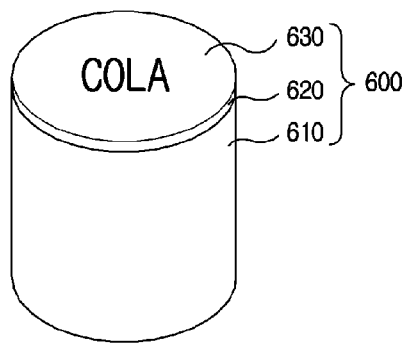
FIG. 27 is a schematic cross-sectional view illustrating an RFID cap according to a second exemplary embodiment of the present invention.

FIG. 27 is a schematic cross-sectional view illustrating an RFID cap according to a second exemplary embodiment of the present invention.

The RFID cap according to a second exemplary embodiment of the present invention may include a cap structure (610), a printing layer (620) printed on an upper surface of the cap structure (610) and dispersed with metal fibers or conductive polymer fibers, and a label printing layer (630) printed on an upper surface of the printing layer (620). Material of cap structure (610) may be plastic, metal and/or ceramic but the material is not limited thereto, where if the material of the cap structure (610) is plastic, the cap structure may become a plastic RFID cap, and if the material of the cap structure (610) is a metal, the cap structure may become a metal RFID cap.

At this time, the an insulation layer is preferably interposed between the metal cap structure (610) and the printing layer (620) dispersed with metal fibers or conductive polymer fibers.

The RFID cap according to a second exemplary embodiment of the present invention is advantageous in that all the caps that are generally distributed and manufactured are formed with a printing layer dispersed with metal fibers or conductive polymer fibers, where the information recorded on the metal fibers or conductive polymer fibers can be detected using the chipless RFID.

Figure 28:
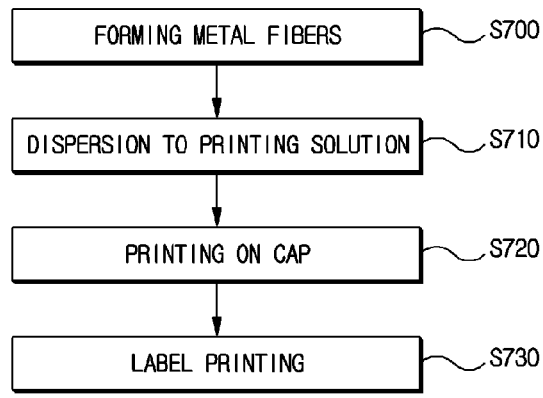
FIG. 28 is a schematic flowchart illustrating an example of a method for manufacturing an RFID cap according to a second exemplary embodiment of the present invention.

FIG. 28 is a schematic flowchart illustrating an example of a method for manufacturing an RFID cap according to a second exemplary embodiment of the present invention.

First, metal fibers or conductive polymer fibers are formed (S700).

Successively, the metal fibers or conductive polymer fibers are dispersed in a printing solution (S710). Successively, the printing solution dispersed with metal fibers or conductive polymer fibers is printed on an upper surface of the cap structure dispersed with metal fibers or conductive polymer fibers (S720). Then, a label is printed on an upper surface of the printing layer (S730).

Figure 29:
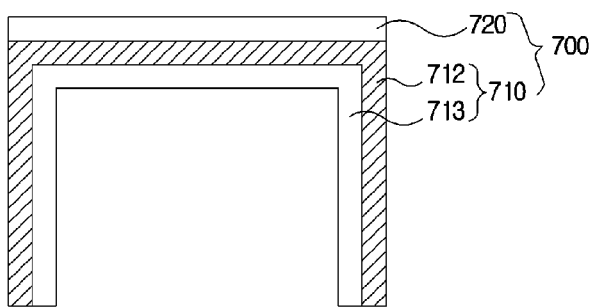
FIG. 29 is a schematic cross-sectional view illustrating an RFID cap according to a third exemplary embodiment of the present invention.

FIG. 29 is a schematic cross-sectional view illustrating an RFID cap according to a third exemplary embodiment of the present invention.

The RFID cap according to a third exemplary embodiment of the present invention may include a metal plate (711), a cap structure (700) including a coating layer (712) coated on the metal plate (711) and dispersed with metal fibers or conductive polymer fibers; and a label printing layer (720) printed on an upper surface of the cap structure (700). The cap structure (700) is formed by using the metal plate (711) coated with the coating layer (712) dispersed with metal fibers or conductive polymer fibers, and putting the metal plate (711) coated with the coating layer (712) dispersed with metal fibers or conductive polymer fibers into a forming frame.

Figure 30:
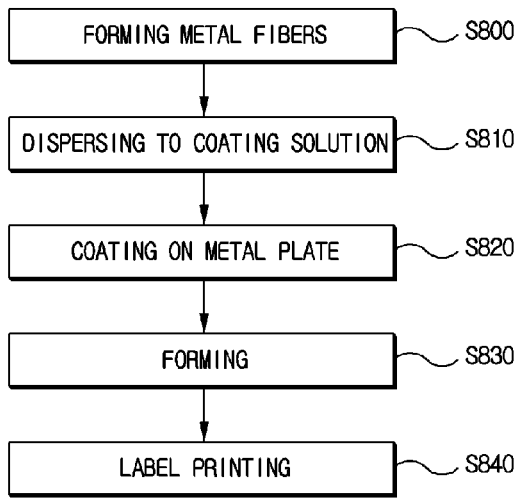
FIG. 30 is a schematic flowchart illustrating an example of an RFID cap according to a third exemplary embodiment of the present invention.

FIG. 30 is a schematic flowchart illustrating an example of an RFID cap according to a third exemplary embodiment of the present invention.

First, metal fibers or conductive polymer fibers are formed (S800).

Successively, the metal fibers or conductive polymer fibers are dispersed in a coating solution (S810). Successively, the coating solution dispersed with metal fibers or conductive polymer fibers is coated on an upper surface of the metal plate (S820). Then, the metal plate (711) coated with the coating layer (712) dispersed with metal fibers or conductive polymer fibers is put into a forming frame to form the cap structure (S830), where the forming process in step 'S830' is such that the metal plate printed with the coating solution dispersed with metal fibers or conductive polymer fibers is put into a forming frame to form the cap structure, just like the conventional container manufacturing process. Successively, the label is printed on an upper surface of the coating layer dispersed with metal fibers or conductive polymer fibers (S840).

Figure 31:
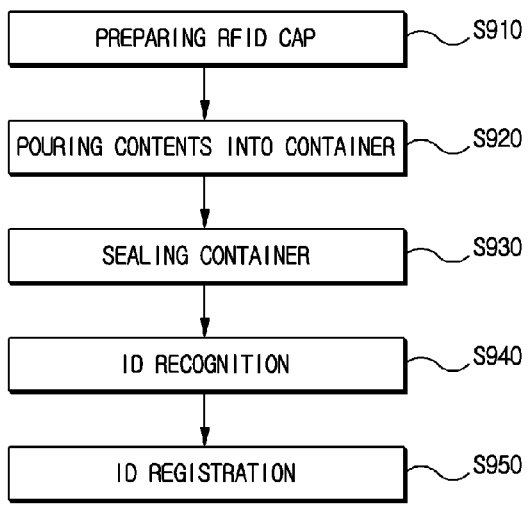
FIG. 31 is a schematic flowchart illustrating a method for manufacturing a container with contents using an RFID cap according to an exemplary embodiment of the present invention.

FIG. 31 is a schematic flowchart illustrating a method for manufacturing a container with contents using an RFID cap according to an exemplary embodiment of the present invention.

The contents according to the exemplary embodiment of the present invention refer to any contents that can be inserted into a container, and representative contents may include beverages, ham, cosmetics, candies, sugar, ice cream, school supplies, tools and computer peripheries. An embedded container may be defined as anything that can contain all the abovementioned contents. Therefore, the container containing the contents may include a vessel containing beverages a can containing ham and a vessel containing cosmetics, for example.

The container containing contents manufactured by using the RFID cap according to first, second and third exemplary embodiments of the present invention can record information of history of container manufacturing processes on the metal fibers or conductive polymer fibers, whereby distribution management and factory management can be advantageously performed during distribution after the container containing the contents is manufactured.

The method for manufacturing a container with contents using an RFID cap may include a step (S910) of preparing an RFID cap according to the first, second and third exemplary embodiments of the present invention.

That is, one of the RFID caps is prepared (S910), where the RFID caps include an RFID cap according to the first exemplary embodiment of the present invention including a cap molding structure dispersed with metal fibers or conductive polymer fibers and a label printing layer printed on an upper surface of the cap molding structure, an RFID cap according to the second exemplary embodiment of the present invention including a cap structure, a printing layer printed on an upper surface of the cap structure and dispersed with metal fibers or conductive polymer fibers and a label printing layer printed on an upper surface of the printing layer, and an RFID cap according to the third exemplary embodiment of the present invention including a metal plate, a cap structure coated on an upper surface of the metal plate and a coating layer dispersed with metal fibers or conductive polymer fibers, and a label printing layer printed on an upper surface of the cap structure.

Successively, contents are poured into a container (S920).

Successively, the container is sealed by the RFID cap (S930). The metal fibers or conductive polymer fibers of the RFID cap are read out by an RFID reader to recognize an ID (S940). At this time, a timing recognizing the ID using the RFID reader may be a time when the container is sealed by the RFID cap. Furthermore, the metal fibers or conductive polymer fibers are dispersed in intrinsic patterns on the coating layer, whereby the RFID reader can recognize the ID of the RFID cap.

Successively, the ID recognized by the RFID reader is matched with the manufacturing information, and the ID is registered with a server (S950).

The manufacturing information means all the information that is used for manufacturing a product using the RFID cap that includes a time for sealing a container and contents information. Furthermore, in a case the server is stored with an ID that matches the manufacturing information, manufacturing information matched to the ID of metal fibers or conductive polymer fibers of the RFID cap can be read by reading out the ID using the chipless RFID technology.

Therefore, the present invention is advantageous in that a container containing contents is manufactured using an RFID cap to easily read out information such as manufacturing information using the chipless RFID technology, such that various information including distribution routes and manufacturing process history can be easily managed after a product is manufactured.

Fifth Aspect of the Present Invention

Figure 32:
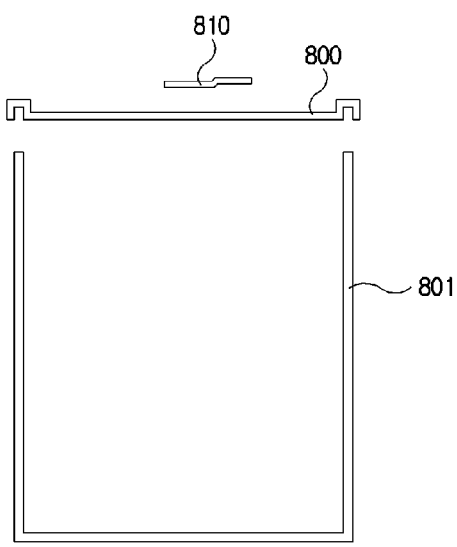
FIG. 32 is a schematic cross-sectional view illustrating an RFID can according to an exemplary embodiment of the present invention.

FIG. 32 is a schematic cross-sectional view illustrating an RFID can according to an exemplary embodiment of the present invention.

An RFID can according to an exemplary embodiment of the present invention may include an upper surface-opened container (801); a can lip (800) configured to seal an upper-opened surface of the container; and a can opener (810) coupled to the can lid (800), wherein at least part of an upper area of the can lid (800) or can opener (810) is formed with a coating layer dispersed with metal fibers or conductive polymer fibers.

Therefore, the RFID can according to an exemplary embodiment of the present invention is formed with a coating layer dispersed with metal fibers or conductive polymer fibers, whereby information can be advantageously read out from the metal fibers or conductive polymer fibers using the RFID technology.

That is, patterns of the metal fibers or conductive polymer fibers dispersed on the coating layer can possess intrinsic values to record information on the patterns of the dispersed metal fibers or conductive polymer fibers. Therefore, the metal fibers or conductive polymer fibers dispersed on the coating layer can be read out using the chipless RFID reader to read out information recorded on the metal fibers or conductive polymer fibers.

For example, in a case the reader irradiates millimeter wave is irradiated to the RFID can, a particular waveform of reflective wave is generated from the metal fibers or conductive polymer fibers dispersed on the coating layer of the RFID can, and the reader detects the reflective wave to detect the information recorded in the metal fibers or conductive polymer fibers.

Meanwhile, the information recorded in the metal fibers or conductive polymer fibers dispersed on the coating layer may include all information related to the RFID can including, but not limited thereto, a time of a cap closed after contents of a beverage bottle or vessel is poured, information on distribution period and price.

Figure 33:
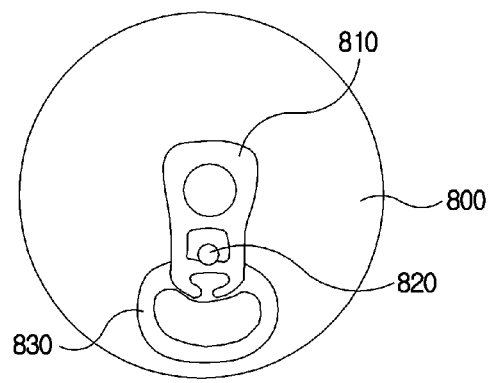
FIG. 33 is a schematic view illustrating a state in which a can lid of a can for RFID and a can opener are coupled according to an exemplary embodiment of the present invention.

FIG. 33 is a schematic view illustrating a state in which a can lid of a can for RFID and a can opener are coupled according to an exemplary embodiment of the present invention.

The can opener (810) is riveted to the can lid (800) by a rivet (820), such that in a case the can lid (810) is pulled, a cut-out line of the can lid (800) is torn to form an opening, whereby contents inside the RFID can be obtained through the opening. A coating layer dispersed with metal fibers or conductive polymer fibers on a part or an entire can lid (800) or the can opener (810) is formed.

Figure 34:
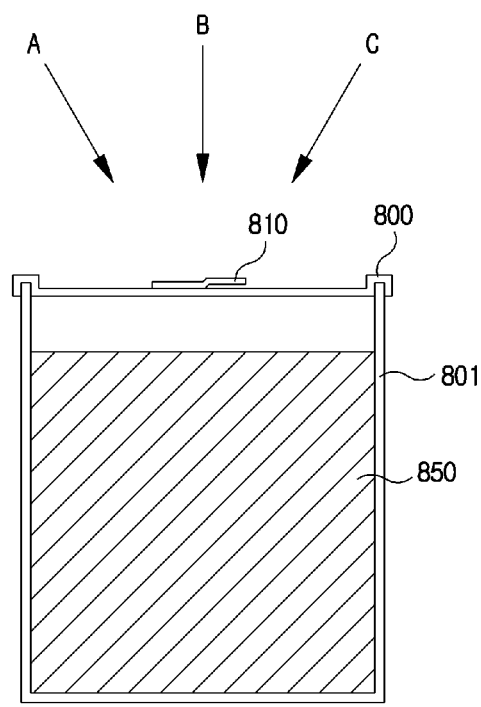
FIG. 34 is a schematic cross-sectional view illustrating an RFID can according to an exemplary embodiment of the present invention.

FIG. 34 is a schematic cross-sectional view illustrating an RFID can according to an exemplary embodiment of the present invention.

The RFID can is such that contents (850) such as beverage is inserted into the upper surface-opened container (801), and an opened area on the container (801) is sealed by the can lid (800) disposed with the can opener (810).

The RFID can, in which contents (850) are contained and whose lid is closed to prevent the contents from being leaked to the outside, is such that the metal fibers or conductive polymer fibers dispersed on the coating layer coated on the can lid (800) or the can opener (810) can be read out by the chipless RFID reader to read out the information recorded in the metal fibers or conductive polymer fibers, when the RFID can is commercially distributed or internally managed. At this time, the can lid (800) or the can opener (801) is positioned on an upper surface of the RFID can, such that the information can be read out from each angle (A, B, C) of the RFID can using the reader.

Figure 35:
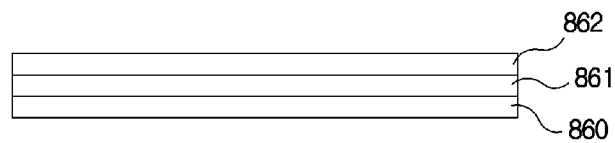
FIG. 35 is a schematic cross-sectional view illustrating an RFID lid or can opener according to an exemplary embodiment of the present invention.

FIG. 35 is a schematic cross-sectional view illustrating an RFID lid or can opener according to an exemplary embodiment of the present invention, where the can lid or the can opener is manufactured by a metal plate-forming process.

In a case the metal plate is formed with a coating layer dispersed with metal fibers or conductive polymer fibers, and in a case contents are poured into a container, the container is sealed by the can lid and the metal fibers or conductive polymer fibers are read out by a reader, the millimeter wave irradiated by the reader is reflected from the metal plate, metal fibers or conductive polymer fibers to generate interference, whereby it is difficult to accurately recognize an intrinsic value such as an ID of the RFID can.

Therefore, as illustrated in FIG. 35, the can lid or the can opener of the RFID can may include a metal plate (860), an insulation layer (861) formed on an upper surface of the metal plate (860), and a coating layer (862) coated on an upper surface of the insulation layer (861) and dispersed with metal fibers or conductive polymer fibers.

That is, in cases the insulation layer (861) is formed on an upper surface of the metal plate (860) formed with the can lid or the can opener, the coating layer (862) dispersed with the metal fibers or conductive polymer fibers on the upper surface of the insulation layer (861) is formed, and the metal plate (860) formed with the insulation layer (861) and the coating layer (862) is poured into a forming frame to form the can lid or the can opener, the millimeter wave irradiated from the reader is reflected by the metal fibers or conductive polymer fibers to rule out reflective wave components reflected by the metal plate, whereby an accurate intrinsic value of the RFID can be recognized.

Figure 36:
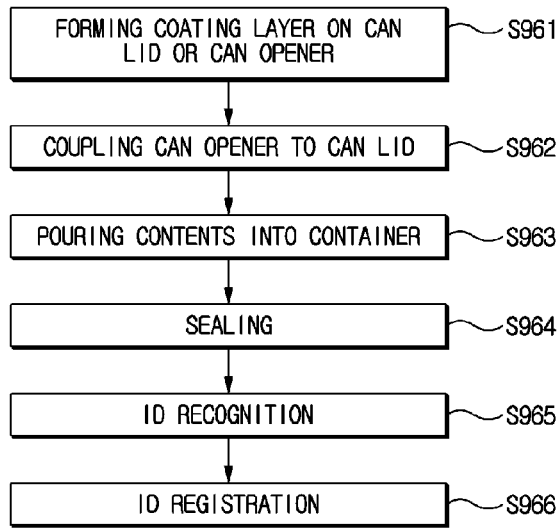
FIG. 36 is a schematic flowchart illustrating a method for manufacturing an RFID can according to an exemplary embodiment of the present invention.

FIG. 36 is a schematic flowchart illustrating a method for manufacturing an RFID can according to an exemplary embodiment of the present invention.

The RFID can is contained with contents, where the contents may include all contents that can be inserted in the can, such as but not limited to liquid, solid and a mixture of the liquid and the solid. Particularly, the contents are preferably beverages.

As a method for manufacturing an RFID can according to an exemplary embodiment of the present invention may include, forming, on at least part of an upper area of a can lid or a can opener, a coating layer dispersed with metal fibers or conductive polymer fibers (S961), coupling the can opener to the can lid (S962), pouring contents into the upper-surface opened container (S963), sealing the upper-surface opened container with the can lid coupled to the can opener (S964), recognizing an ID by reading the metal fibers or conductive polymer fibers using the reader (S965), where a timing of recognizing the ID by using the RFID reader may be the moment in which the container is sealed by the RFID lid coupled with the can opener, and where the metal fibers or conductive polymer fibers are dispersed on the coating layer of the can lid or the can opener, such that the RFID reader can recognize the ID of the RFID can, and matching the ID recognized by the RFID reader to the manufacturing information to register the ID with a server (S966).

The manufacturing information of RFID can means all the information for manufacturing the RFID can that includes a time on which the can was sealed using a lid and contents information. Furthermore, in a case an ID matching to the manufacturing information is stored in the server, the manufacturing information matching to the ID can be read out if the ID is read out after the RFID can is manufactured and the metal fibers or the conductive polymer fibers of the manufactured RFID can are read out using the chipless RFID technology.

Therefore, the present invention has an advantageous effect in that the RFID can can be manufactured and information such as manufacturing information can be easily read out by the chipless RFID technology, whereby various information such as distribution routes after manufacturing and manufacturing process history can be conveniently managed.

Sixth Aspect of the Present Invention

Figure 37:
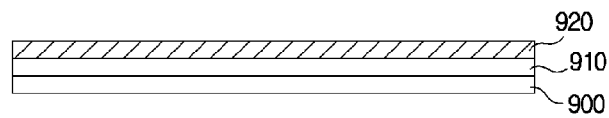
FIG. 37 is a schematic cross-sectional view illustrating a packaging material for chipless RFID according to a first exemplary embodiment of the present invention.

FIG. 37 is a schematic cross-sectional view illustrating a packaging material for chipless RFID according to a first exemplary embodiment of the present invention.

The packaging material for RFID according to the first exemplary embodiment of the present invention may include a sheet (900); a packaging printing layer (910) printed on an upper surface of the sheet (900); and a transparent resin layer (920) printed on the packaging printing layer (910) and dispersed with metal fibers or conductive polymer fibers. The packaging material for chipless RFID may be variably applicable for various use for packaging various products that are generally used in our life, including a packaging paper, a packaging case, a packaging vessel and a packaging box.

Furthermore, the packaging printing layer (910) may include various figures, images and designs for adding beauty to the packaging. Particularly, the packaging printing layer (910) may include a code printing layer which is one of a one dimensional (1D) authenticating code like manufacturing information or a bar code, a two dimensional (2D) authenticating code, a three dimensional (3D) authenticating code, and a color code. The material for the sheet may include all materials having a broad plate shape such as paper, cloth, glass, metal, wood and plastic.

Furthermore, the packaging material for chipless RFID according to the first exemplary embodiment of the present invention is formed with the transparent resin layer (920) dispersed with metal fibers or conductive polymer fibers, and IDs can be read out from the metal fibers or conductive polymer fibers dispersed on the transparent resin layer (920), whereby an authenticating process can be implemented using the chipless RFID technology.

For example, in a case the reader irradiates millimeter wave is irradiated to the transparent resin layer (920) dispersed with metal fibers or conductive polymer fibers, a particular waveform of reflective wave is generated from the metal fibers or conductive polymer fibers, and the reader detects the reflective wave to detect an intrinsic ID recorded in the metal fibers or conductive polymer fibers dispersed on the transparent resin layer (920).

Therefore, the packaging material for chipless RFID according to the first exemplary embodiment of the present invention has an advantageous effect in that the material is formed with the transparent resin layer dispersed with metal fibers or conductive polymer fibers from which an intrinsic value such as ID number and recorded information can be detected using dispersed patterns of the metal fibers or conductive polymer fibers to thereby implement a chipless RFID technology.

Figure 38:
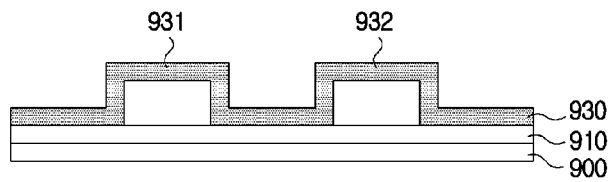
FIG. 38 is a schematic cross-sectional view illustrating a packaging material for RFID according to a second exemplary embodiment of the present invention.

FIG. 38 is a schematic cross-sectional view illustrating a packaging material for RFID according to a second exemplary embodiment of the present invention.

The packaging material for RFID according to the second exemplary embodiment of the present invention may include a sheet (900); a packaging printing layer (910) printed on an upper surface of the sheet (900); and a transparent resin film (930) fixed to packaging printing layer (910) and formed with at least one or more product shape units (931, 932) and dispersed with metal fibers or conductive polymer fibers.

The packaging material for RFID according to the second exemplary embodiment of the present invention is such that a product is inserted into the product shape units (931, 932) of the transparent resin film (930), and the transparent resin film (930) is fixed to the packaging printing layer (910) using coupling or attaching method. The transparent resin film (930) fixed to packaging printing layer (910) and formed with at least one or more product shape units (931, 932) and dispersed with metal fibers or conductive polymer fibers is inputted into a heated forming frame to form the packaging material for RFID according to the second exemplary embodiment of the present invention. Other methods may be also employed to manufacture the packaging material for RFID. Furthermore, the product that is inserted into the product shape units (931, 932) may be applicable to any product that is used for our daily life such as tooth brushes, rasors, pills, mouses, dry cells, game machines and fruits.

Figure 39:
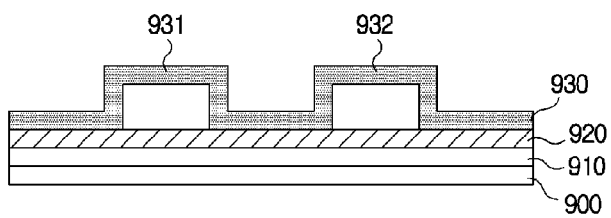
FIG. 39 is a schematic cross-sectional view illustrating a packaging material for RFID according to a third exemplary embodiment of the present invention.

FIG. 39 is a schematic cross-sectional view illustrating a packaging material for RFID according to a third exemplary embodiment of the present invention.

The packaging material for RFID according to the third exemplary embodiment of the present invention may include a sheet (900); a packaging printing layer (910) printed on an upper surface of the sheet (900); a transparent resin layer (920) printed on the packaging printing layer (910) and dispersed with metal fibers or conductive polymer fibers, and a transparent resin film (930) fixed to the transparent resin layer (920), formed with at least one or more product shape units (931, 932) and dispersed with metal fibers or conductive polymer fibers.

The packaging material for chipless RFID according to the present invention has an advantageous effect in that metal fibers or conductive polymer fibers are respectively dispersed on the transparent resin layer (920) and transparent resin film (930), whereby an intrinsic value such as ID is provided by patterns of metal fibers or conductive polymer fibers made by the transparent resin layer and transparent resin film to make it more difficult to hack, whereby a stronger security can be maintained.

Figure 40:
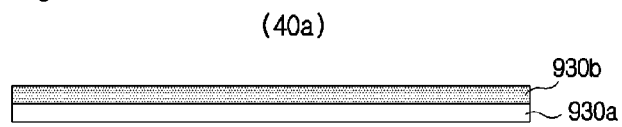
FIGS. 40a and 40b are schematic cross-sectional views illustrating an example of manufacturing a transparent resin film equipped with a product shape unit according to second and third exemplary embodiments of the present invention.
Figure 40:
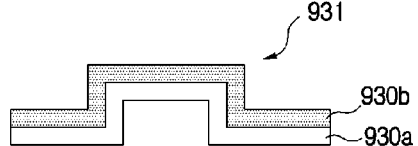

FIGS. 40*a* and 40*b* are schematic cross-sectional views illustrating an example of manufacturing a transparent resin film equipped with a product shape unit according to second and third exemplary embodiments of the present invention.

The product shape unit serves to allow a product to be inserted thereinto, whereby the product is protected from outside. The product shape unit also serves to better show the product to a user by making material thereof with a transparent material. An example of manufacturing the transparent resin film formed with the product shape unit is such that a resinous transparent film (930*a*) is printed with a transparent resin layer (930*b*) dispersed with metal fibers or conductive polymer fibers, as illustrated in FIG. 40*a*. Thereafter, The resinous transparent film (930*a*) printed with the transparent resin layer (930*b*) dispersed with metal fibers or conductive polymer fibers is inputted into a heated forming frame to form a transparent resin film formed with at least one or more product shape units (931) and dispersed with metal fibers or conductive polymer fibers.

Therefore, the transparent resin film formed with the product shape unit according to the exemplary embodiment of the present invention includes the resinous transparent film (930*a*) and the transparent resin layer (930*b*) printed on the resinous transparent film (930*a*) and dispersed with metal fibers or conductive polymer fibers. Material of the resinous transparent film (930*a*) may include one of a group consisting of PET (Poly Ethylene Terephthalate), PE (Poly Ethylene) and PVE (Poly Vinyl Chloride).

Figure 41:
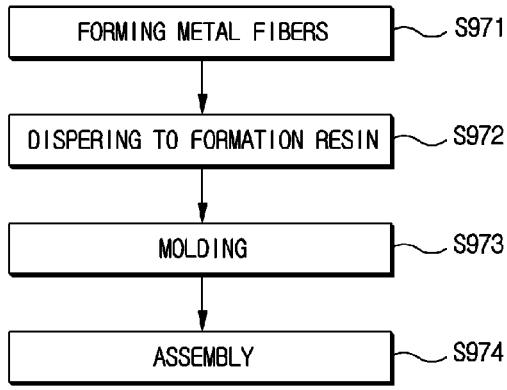
FIG. 41 is a schematic flowchart illustrating a method for manufacturing a packaging material for RFID according to an exemplary embodiment of the present invention.

FIG. 41 is a schematic flowchart illustrating a method for manufacturing a packaging material for RFID according to an exemplary embodiment of the present invention.

The method for manufacturing a packaging material for RFID may include the following steps: First, forming metal fibers or conductive polymer fibers (S971), where the metal fibers or conductive polymer fibers are manufactured by coating textile fibers with metal or conductive polymer, or by grinding a metal body or a conductive polymer body. That is, each of the metal fibers or the conductive polymer fibers may include a textile fiber, and a metal layer or a conductive polymer layer coated with the textile fiber, or a metal fiber or a conductive polymer fiber of a single material. Thereafter, the metal fibers or conductive polymer fibers are dispersed on a transparent molding resin (S972).

Successively, the transparent molding resin dispersed with metal fibers or conductive polymer fibers is molded to form at least one product shape unit and to form a transparent resin film dispersed with metal fibers or conductive polymer fibers (S973). Successively, a transparent resin film dispersed with the metal fibers or conductive polymer fibers is assembled on a sheet printed on an upper surface of the packaging printing layer or a sheet printed with a transparent resin layer dispersed with the metal fibers or conductive polymer fibers (S974).

Figure 42:
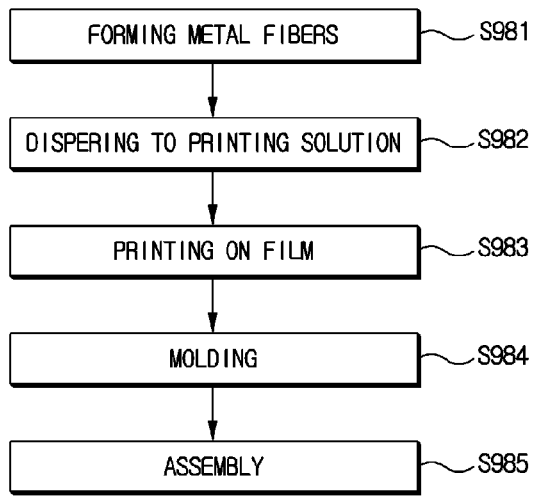
FIG. 42 is a schematic flowchart illustrating another method for manufacturing a packaging material for RFID according to an exemplary embodiment of the present invention.

FIG. 42 is a schematic flowchart illustrating another method for manufacturing a packaging material for RFID according to an exemplary embodiment of the present invention.

First, metal fibers or conductive polymer fibers are formed (S981). The metal fibers or conductive polymer fibers are dispersed in a transparent printing solution (S982). Successively, the transparent printing solution dispersed with metal fibers or conductive polymer fibers is printed on an upper surface of the resinous transparent film (S983). Then, the resinous transparent film printed with transparent printing solution dispersed with metal fibers or conductive polymer fibers is put into a heated forming frame (S984), where the forming process in step 'S984' is such that the transparent resin film printed with the transparent printing solution dispersed with metal fibers or conductive polymer fibers is put into a forming frame to form the transparent resin film formed with the product shape unit, just like the conventional container manufacturing process. Successively, a transparent resin film dispersed with the metal fibers or conductive polymer fibers is assembled on a sheet printed on an upper surface of the packaging printing layer or a sheet printed with a transparent resin layer dispersed with the metal fibers or conductive polymer fibers (S985).

Figure 43:
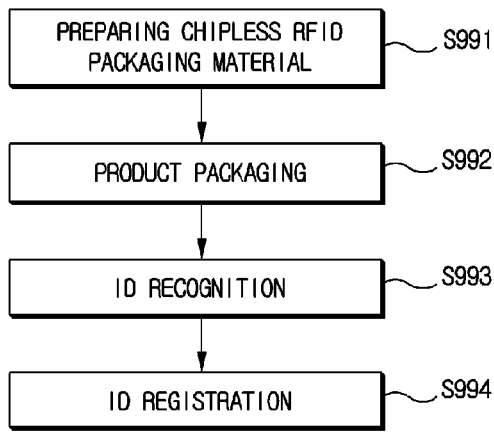
FIG. 43 is a schematic flowchart illustrating a method for packaging product using a packaging material for RFID according to an exemplary embodiment of the present invention.

FIG. 43 is a schematic flowchart illustrating a method for packaging product using a packaging material for RFID according to an exemplary embodiment of the present invention.

The method for packaging product using a packaging material for RFID according to an exemplary embodiment of the present invention is the product packaging method using a chipless RFID packaging material formed with a product shape unit of the second exemplary embodiment and including a transparent resin film dispersed with metal fibers or conductive polymer fibers. Of course, the chipless RFID packaging material according to the third exemplary embodiment can also implement the product packaging method.

That is, the method for packaging product using a packaging material for RFID according to an exemplary embodiment of the present invention includes, for a start, preparing a sheet, a packaging printing layer printed on an upper surface of the sheet, an RFID packaging material fixed on the packaging printing layer and formed with at least one product shape unit and including a transparent resin film dispersed with metal fibers or conductive polymer fibers (S310), inserting a product into the product shape unit of transparent resin film dispersed with the metal fibers or conductive polymer fibers, and packaging the product by coupling the transparent resin film with the a base plate such that the product shape unit can be tightly sealed (S320), recognizing an ID by reading, by an RFID reader, the metal fibers or conductive polymer fibers (S330), where the RFID reader recognizes the ID of the chipless RFID packaging material because the metal fibers or the conductive polymer fibers are dispersed on the transparent resin film in intrinsic patterns, and registering the ID with a server by matching the ID recognized by the RFID reader with packaging information.

The packaging information means all the information including a time on which the product was packaged, product information for packaging product using the chipless RFID packaging material. In a case an ID matching to the manufacturing information is stored in the server, the manufacturing information matching to the ID can be read out if the ID is read out after a product is packaged using the chipless RFID packaging material and the metal fibers or the conductive polymer fibers of the packaged product are read out using the chipless RFID technology.

Therefore, the present invention has an advantageous effect in that the information including the packaging information can be easily read out using the chipless RFID technology by packaging a product with the chipless RFID packaging material, whereby various management can be conveniently implemented after the product is packaged.

Seventh Aspect of the Present Invention

Figure 44:
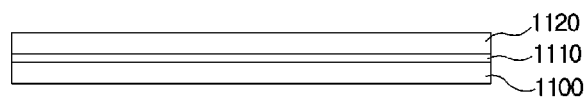
FIG. 44 is a schematic cross-sectional view illustrating a certificate for chipless RFID according to a first exemplary embodiment of the present invention.

FIG. 44 is a schematic cross-sectional view illustrating a certificate for chipless RFID according to a first exemplary embodiment of the present invention.

The certificate for chipless RFID according to a first exemplary embodiment of the present invention may include an object (1100), a printing layer (1110) printed with certificate contents on the object (1100), and a transparent resin layer (1120) printed on the object (1100) and/or printing layer (1110), and dispersed with metal fibers or conductive polymer fibers, where the printing layer (1110).

The printing layer (1110) is a layer printed with authentication contents of a relevant certificate and may be printed with various contents including handwritings, designs and images. Although FIG. 1 schematically illustrates the printing layer (1110) in a single layer, the printing layer (1110) is actually formed with lots of spaces. The object (1100) may include structures comprised of paper, cloth, glass, metal, wood and plastic. The object preferably has a plated shape.

Figure 45:
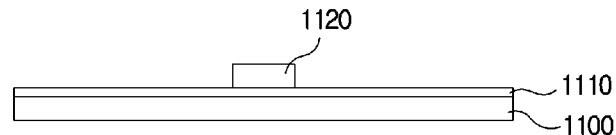
FIG. 45 is a schematic cross-sectional view illustrating a certificate for chipless RFID according to a second exemplary embodiment of the present invention.
Figure 46:
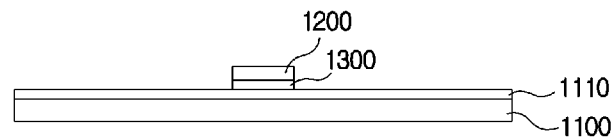
FIG. 46 is a schematic cross-sectional view illustrating a certificate for chipless RFID according to a third exemplary embodiment of the present invention.

FIG. 45 is a schematic cross-sectional view illustrating a certificate for chipless RFID according to a second exemplary embodiment of the present invention, and FIG. 46 is a schematic cross-sectional view illustrating a certificate for chipless RFID according to a third exemplary embodiment of the present invention.

The second exemplary embodiment of the present invention is a certificate formed by printing a transparent resin layer (1120) dispersed with metal fibers or conductive polymer fibers printed on a partial area of the object (1100) and/or printing layer (1110). The third exemplary embodiment of the present invention is a certificate formed by being stuck with a hologram changing colors of an image in response to a reflection angle or refraction angle of incident light and a sticker (1200) including a transparent resin dispersed with metal fibers and conductive polymer fibers on a partial area of the object (1100) and/or the printing layer (1110). The sticker (1200) is formed thereunder with an adhesive layer (1130).

Figure 47:
FIG. 47 is a schematic cross-sectional view illustrating an example of a certificate for chipless RFID according to a third exemplary embodiment of the present invention.
Figure 48:
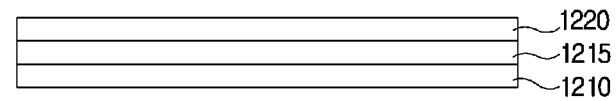
FIG. 48 is a schematic cross-sectional view illustrating another example of a certificate for chipless RFID according to a third exemplary embodiment of the present invention.

The sticker, including a hologram attached to the certificate for chipless RFID according to a third exemplary embodiment of the present invention and he transparent resin dispersed with metal fibers and conductive polymer fibers on a partial area of the object (1100) and/or the printing layer (1110), may be implemented in various structures as shown in FIGS. 47 and 48 (described later).

Therefore, the certificate for chipless RFID according to a third exemplary embodiment of the present invention is configured by a hologram film printed with transparent resin layer dispersed with metal fibers and conductive polymer fibers, such that colors of an image can be changed according to viewing angles, and shapes of the image can be changed by the metal fibers or the conductive polymer fibers, thereby providing an intrinsicality.

FIG. 47 is a schematic cross-sectional view illustrating an example of a certificate for chipless RFID according to a third exemplary embodiment of the present invention, and FIG. 48 is a schematic cross-sectional view illustrating another example of a certificate for chipless RFID according to a third exemplary embodiment of the present invention.

FIG. 47, which is a kind of a sticker including a hologram attached to a certificate for chipless RFID and a transparent resin dispersed with metal fibers and conductive polymer fibers, the sticker may include a hologram film (1210) changing colors of image in response to a reflection angle or refraction angle of incident light, and a transparent resin layer (1220) printed on or adhered to an upper surface of the hologram film and dispersed with metal fibers or conductive polymer fibers.

Therefore, the certificate for chipless RFID according to a third exemplary embodiment of the present invention in FIG. 48 may include a hologram film (1210) changing colors of image in response to a reflection angle or refraction angle of incident light, and a transparent resin layer (1220) printed on or adhered to an upper surface of the hologram film and dispersed with metal fibers or conductive polymer fibers. The configuration of sticker is such that the transparent resin film (1220) is attached to the hologram film (1210) in a sticker form. An adhesive layer (215) is interposed between the hologram film (1210) and the transparent resin film (1220).

Figure 49:
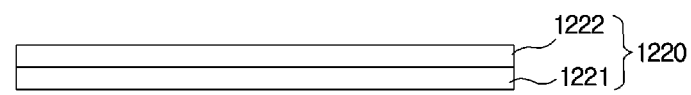
FIG. 49 is a schematic cross-sectional view illustrating a transparent resin film dispersed with metal fibers or conductive polymer fibers according to a third exemplary embodiment of the present invention.

Referring to FIG. 49, the transparent resin layer (1220) dispersed with metal fibers or conductive polymer fibers may include a transparent resin film (1221), and a transparent resin layer (1222) printed on an upper surface of the transparent resin film and dispersed with metal fibers or conductive polymer fibers. The material of the transparent resin film may include PET (Poly Ethylene Terephthalate).

Figure 50:
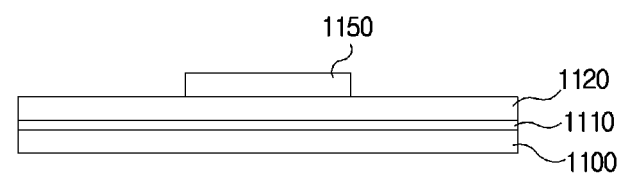
FIG. 50 is a schematic cross-sectional view illustrating an example of a certificate for chipless RFID according to a fourth exemplary embodiment of the present invention.

FIG. 50 is a schematic cross-sectional view illustrating an example of a certificate for chipless RFID according to a fourth exemplary embodiment of the present invention.

The certificate for chipless RFID according to a fourth exemplary embodiment of the present invention may include an object (1100), a printing layer (1110) printed with certificate contents on the object (1100), and a transparent resin layer (1120) printed on the object (1100) and/or printing layer (1110), and dispersed with metal fibers or conductive polymer fibers, and a certificate code printing layer (1150) printed on an upper surface of the transparent resin layer (1120), where the certificate code printing layer (1150) may be a layer printed with an intrinsic ID code, and particularly one of a one dimensional (1D) authenticating code, a two dimensional (2D) authenticating code, a three dimensional (3D) authenticating code, and a color code.

Therefore, the certificate for chipless RFID according to the fourth exemplary embodiment of the present invention is formed with a transparent resin layer dispersed with metal fibers or conductive polymer fibers and a certificate code printing layer, such that an ID detected from the metal fibers or conductive polymer fibers dispersed on the transparent resin layer is matched to an ID detected from the certificate code printing layer, whereby an accurate authentication can be advantageously implemented to enhance the reliability of the certificate.

Figure 51:
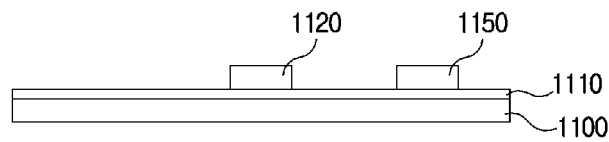
FIG. 51 is a schematic cross-sectional view illustrating an example of a certificate for chipless RFID according to a fifth exemplary embodiment of the present invention.

FIG. 51 is a schematic cross-sectional view illustrating an example of a certificate for chipless RFID according to a fifth exemplary embodiment of the present invention.

The certificate for chipless RFID according to a fifth exemplary embodiment of the present invention may include an object (1100), a printing layer (1110) printed with certificate contents on the object (1100), and a transparent resin layer (1120) printed on a partial area of the object (1100) and/or printing layer (1110), and dispersed with metal fibers or conductive polymer fibers, and a certificate code printing layer (1150) discrete from the transparent resin layer (1120) and printed on the other partial area of the object (1100) and/or printing layer (1110).

Figure 52:
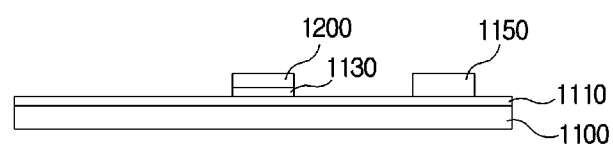
FIG. 52 is a schematic cross-sectional view illustrating an example of a certificate for chipless RFID according to a sixth exemplary embodiment of the present invention.

Therefore, as shown in FIG. 52, a certificate for chipless RFID according to a sixth exemplary embodiment of the present invention may be implemented by including an object (1100), a printing layer (1110) printed with certificate contents on the object (1100), a sticker (1200) attached to a partial area of the object (1100) and/or the printing layer (1110) and including a transparent resin dispersed with a hologram, metal fibers and conductive polymer fibers, and a certificate code printing layer (1150) discrete from the transparent resin layer (1120) and printed on the other partial area of the object (1100) and/or printing layer (1110). An adhesive layer (1130) may be formed underneath the sticker (1200).

Figure 53:
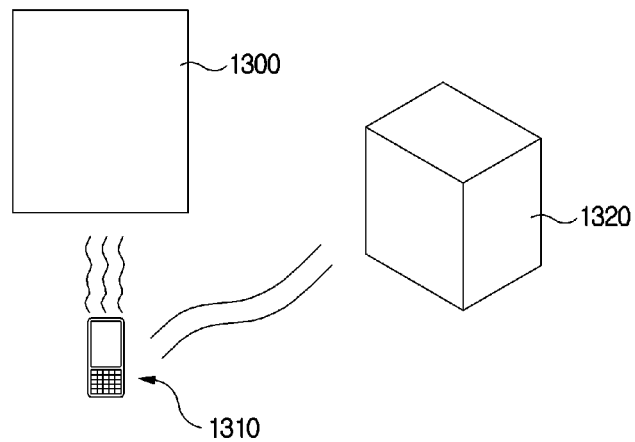
FIG. 53 is a schematic diagram illustrating authentication of a certificate for chipless RFID according to the present invention.

FIG. 53 is a schematic diagram illustrating authentication of a certificate for chipless RFID according to the present invention.

As mentioned above, a certificate (1300) for chipless RFID according to the present invention is equipped with metal fibers or conductive polymer fibers dispersed on the transparent resin, such that, in order to read out an intrinsic value such as an ID recorded in the metal fibers or conductive polymer fibers of the certificate for chipless RFID, an RFID reader must be equipped.

Therefore, the present invention is such that an RFID reader is attached to a terminal (1310), and the RFID reader of the terminal (1310) reads out an intrinsic value recorded in the metal fibers or conductive polymer fibers of the chipless RFID to perform the authentication. The terminal (1310) may be a portable terminal such as a mobile phone, a notebook, an PMP, and an MP3.

At this time, in a case the intrinsic value is authenticated by the RFID reader of the terminal (1310), the certificate (1300) for the chipless RFID according to the present invention can determine a genuine certificate that is not forged or modified. Furthermore, added information coupled with the certificate (1300) for chipless RFID according to the present invention can be issued, and to this end, the present invention can be cooperated with the terminal (1310) and a server (1320) formed with the added information may be provided.

That is, after the ID is read out from the RFID reader of the terminal (1310) is authenticated, the ID can be transmitted to the server (1320) from the terminal (1310), where the server (1320) transmits the added information to the terminal (1310) and issues the ID, if the received ID is an effective ID. The communication between the server (1320) and the terminal (1310) is realized on a wired or wireless communication network through wired or wireless data communication. Furthermore, the added information may include all data necessary for a user including various civil certificates, court decisions, transcripts and medical records. Therefore, the user can receive the added information from the server (1320) on the terminal (1310).

Figure 54:
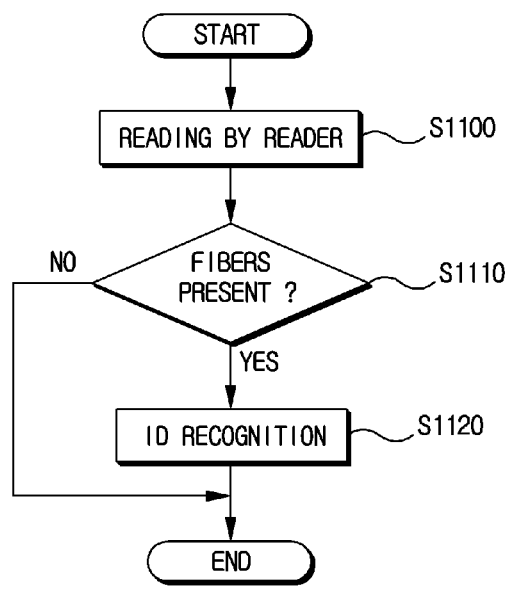
FIG. 54 is a schematic flowchart illustrating a flow of an example of a method for authentication of a certificate for chipless RFID according to the present invention.

FIG. 54 is a schematic flowchart illustrating a flow of an example of a method for authentication of a certificate for chipless RFID according to the present invention.

The method for authenticating a certificate for chipless RFID may include, reading, by an RFID reader, a certificate for chipless RFID (S1100); determining, as a result of the reading of the certificate for chipless RFID, whether the certificate for chipless RFID is present with metal fibers or conductive polymer fibers (S1110); and recognizing an ID contained in the metal fibers or conductive polymer fibers of the certificate for chipless RFID, if the certificate for chipless RFID is present with metal fibers or conductive polymer fibers (S1120), where the steps of S1110 and S1120 may be so configured as to be implemented by the terminal.

Furthermore, if the certificate for chipless RFID is not present with metal fibers or conductive polymer fibers, it is determined that the certificate is not the genuine certificate. By implementing the above-mentioned steps of S1100 to S1120, determination is made as to whether a certificate is a genuine one using the metal fibers or conductive polymer fibers present on the certificate for chipless RFID.

Figure 55:
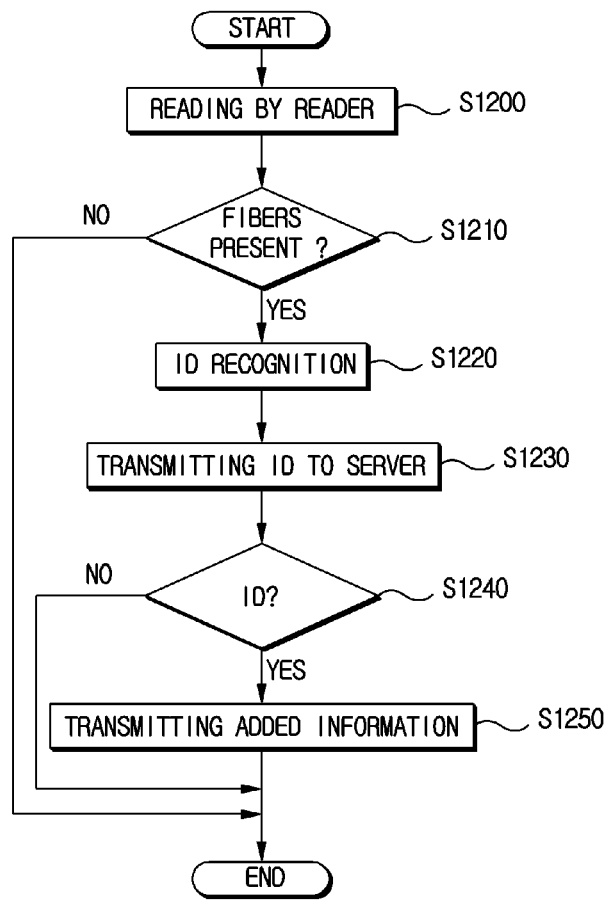
FIG. 55 is a schematic flowchart illustrating a flow of another example of a method for authentication of a certificate for chipless RFID according to the present invention.

FIG. 55 is a schematic flowchart illustrating a flow of another example of a method for authentication of a certificate for chipless RFID according to the present invention.

The method for authentication of a certificate for chipless RFID according to the present invention may include, for a start, reading, by an RFID reader, a certificate for chipless RFID (S1200), determining, as a result of the reading of the certificate for chipless RFID, whether the certificate for chipless RFID is present with metal fibers or conductive polymer fibers (S1210); and recognizing an ID contained in the metal fibers or conductive polymer fibers of the certificate for chipless RFID, if the certificate for chipless RFID is present with metal fibers or conductive polymer fibers (S1220), transmitting the recognized ID to a server formed with added information (S1230), and determining, by the server, whether the received ID has a right to be issued with the added information (S1240), where the step of 'S1240' determines whether an ID is a legitimate ID capable of downloading the added information of the server, and appropriateness of ID and effectiveness of ID (effective date) determines whether the ID has a right capable of being issued with the added information, and successively transmitting, by the server, the added information to the terminal to complete the issuing process if the received ID has a right capable of being issued with the added information (S1250).

Figure 56:
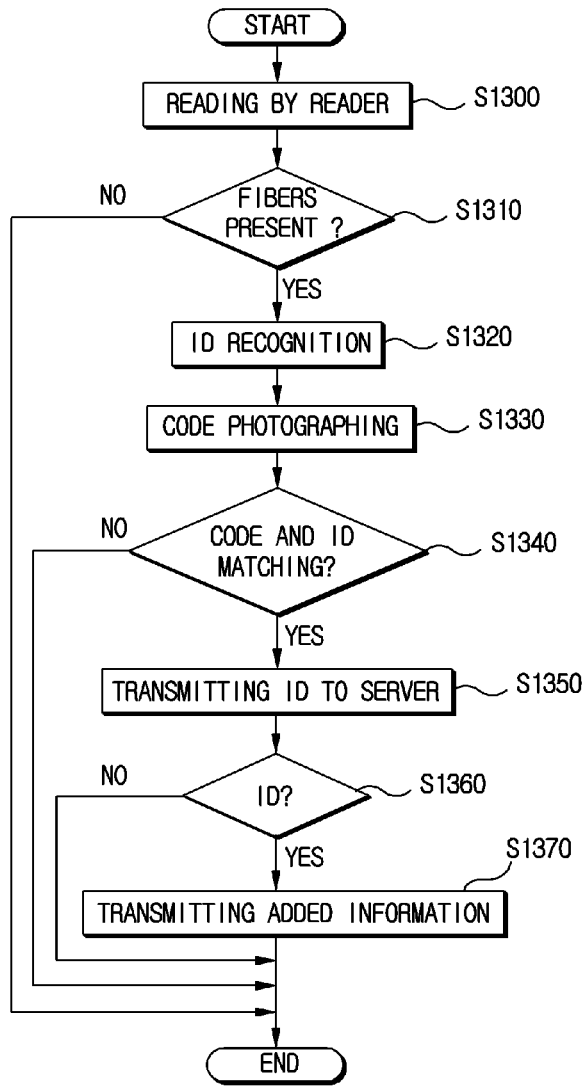
FIG. 56 is a schematic flowchart illustrating a flow of still another example of a method for authentication of a certificate for chipless RFID according to the present invention.

FIG. 56 is a schematic flowchart illustrating a flow of still another example of a method for authentication of a certificate for chipless RFID according to the present invention.

The method for authentication of the certificate for chipless RFID according to the present invention is to authenticate a certificate for chipless RFID formed with a certificate code printing layer, and a more accurate authentication is performed by matching an ID detected by the metal fibers or conductive polymer fibers dispersed on the transparent resin layer to an ID detected by the certificate code printing layer.

The method includes, reading, by an RFID reader of the terminal in 'S1300', 'S1310 and 'S1320', a certificate for chipless RFID, determining, as a result of the reading of the certificate for chipless RFID, whether the certificate for chipless RFID is present with metal fibers or conductive polymer fibers, recognizing an ID contained in the metal fibers or conductive polymer fibers of the certificate for chipless RFID, if the certificate for chipless RFID is present with metal fibers or conductive polymer fibers, photographing the certificate code printing layer of the certificate for chipless RFID to recognize the ID recorded on the certificate code printing layer (S1320), where the terminal photographs the certificate code printing layer (S1330) which is provided with an authentication code, where the ID can be recognized by analyzing the authentication code provided on the certificate code printing layer using an image of photographed certificate code printing layer, determining whether the ID recognized by the metal fibers or conductive polymer fibers matches to the ID recognized by the certificate code printing layer (S1340), transmitting the ID recognized by the metal fibers or conductive polymer fibers and/or the ID recognized by the certificate code printing layer to a server equipped with added information, if the ID recognized by the metal fibers or conductive polymer fibers matches to the ID recognized by the certificate code printing layer (S1350), determining, by the server, whether the received ID has a right capable of being issued with added information (S1360), and issuing the added information by transmitting, by the server, the added information to a terminal to complete the issuing process, if the received ID has a right capable of being issued with the added information (S1370).

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The present invention has industrial applicability in that the chipless RFID technology can be implemented by patterns made by metal fibers or conductive polymer fibers dispersed on an object, where the technology can be applied to all industrial fields to provide an intrinsicality and an accurate authentication, to prevent forgery and variation, hacking, to detect information, to manage distribution routes and manufacturing process history and to maintain a tight security.

The invention claimed is:

1. An RFID tag, the tag comprising:
a base film;
a transparent resin layer printed on an upper surface of the base film and dispersed with metal fibers or conductive polymer fibers;
an antenna formed on an upper surface of the transparent resin layer; and
a tag chip formed on the antenna and connected to the antenna;
wherein a first identification (ID) code is contained in the tag chip and transmitted to a reader through the antenna;
wherein a second identification (ID) code is contained in the transparent resin layer and transmitted to the reader by a signal reflected by the metal fibers or conductive polymer fibers;
wherein the tag chip is configured to operate independently from the transparent resin layer including the metal fibers or conductive polymer fibers;
wherein a lower surface of the antenna directly contacts an upper surface of the transparent resin layer;
wherein a lower surface of the tag chip directly contacts an upper surface of the antenna;
wherein the antenna comprises:
a first antenna member formed on the transparent resin layer, and
a second antenna member formed on the transparent resin layer and spaced apart from the first antenna member; and
wherein the lower surface of the tag chip comprises:
a first region directly contacting an upper surface of the first antenna member,
a second region directly contacting an upper surface of the second antenna member, and
a third region disposed between the first region and the second region.

2. The RFID tag of claim 1, wherein that the antenna is a conductive paste printed on an upper surface of the transparent resin layer.

3. The RFID tag of claim 1, wherein that each of the metal fibers or the conductive polymer fibers takes a shape with a length longer than a thickness or with at least one curvature.

4. The RFID tag of claim 1, wherein that each of the metal fibers or the conductive polymer fibers includes a textile fiber, and a metal layer coated with the textile fiber or a conductive polymer layer, or a metal fiber of a single material, or conductive polymer fibers.

5. An RFID system, the system comprising:
- an RFID tag including a base film, a transparent resin layer printed on an upper surface of the base film and dispersed with metal fibers or conductive polymer fibers, an antenna formed on an upper surface of the transparent resin layer, and a tag chip formed on the antenna and connected to the antenna; and a terminal including a reader capable of recognizing a first identification (ID) code by the tag chip, and capable of recognizing a second identification (ID) code by the metal fibers or conductive polymer fibers dispersed on the transparent resin layer;
- wherein the first ID code is contained in the tag chip and the second ID code is contained in the transparent resin layer;
- wherein the reader is configured to recognize the first ID code transmitted from the antenna and to recognize the second ID code transmitted by a signal reflected by the metal fibers or conductive polymer fibers;
- wherein the tag chip is configured to operate independently from the transparent resin layer including the metal fibers or conductive polymer fibers;
- wherein a lower surface of the antenna directly contacts an upper surface of the transparent resin layer;
- wherein a lower surface of the tag chip directly contacts an upper surface of the antenna;
- wherein the antenna comprises:
  - a first antenna member formed on the transparent resin layer, and
  - a second antenna member formed on the transparent resin layer and spaced apart from the first antenna member; and
- wherein the lower surface of the tag chip comprises:
  - a first region directly contacting an upper surface of the first antenna member,
  - a second region directly contacting an upper surface of the second antenna member, and
  - a third region disposed between the first region and the second region.

6. The RFID system of claim 5, wherein that the reader includes a UHF (Ultra High Frequency) reader module configured to receive a first RF (Radio Frequency) signal transmitted by the antenna connected to the tag chip to recognize the first ID code; and
- a chipless reader module configured to receive a second RF signal reflected from the metal fibers or conductive polymer fibers dispersed on an upper surface of the transparent resin layer to recognize the second ID code.

7. The RFID system of claim 6, wherein that the UHF reader module includes a first RF receiver configured to receive a first RF signal transmitted from an antenna connected to the tag chip;
- a BB (Base Band) processor configured to convert the first RF signal received by the first RF receiver to a BB signal; and
- a first controller configured to detect a first ID code using the BB signal converted by the BB processor.

8. The RFID system of claim 6, wherein that the chipless reader module includes a second RF receiver configured to receive a second RF signal reflected by metal fibers or conductive polymer fibers dispersed on the transparent resin layer;
- a DSP (Digital Signal Processor) configured to digital-signal-process the second RF signal received by the second RF receiver; and
- a second controller configured to detect a second ID code using the signal digitally processed by the DSP.

9. The RFID system of claim 5, wherein that the terminal includes an ID verifier configured to verify matching between the first ID code recognized by the UHF reader module and the second ID code recognized by the chipless reader module.

10. The RFID system of claim 9, wherein that the ID verifier is an ID verifier including an ID code generating function using the first ID code or second ID code.

11. The RFID system of claim 5, wherein that the RFID system includes a server configured to determine a right capable of issuing added information by receiving an ID code from the terminal, and to issue the added information to the terminal if there is the right capable of issuing the added information.

12. The RFID system of claim 5, wherein that the terminal is one of a mobile terminal, a notebook, a portable multimedia player (PMP) and an MP3.

13. A method for controlling an RFID system, the method comprising:
- reading an RFID tag using a reader of a terminal;
- determining whether metal fibers or conductive polymer fibers are present on the RFID tag as a result of reading by the reader of the terminal;
- recognizing a first identification(ID) code contained in the metal fibers or the conductive polymer fibers of the RFID tag, if it is determined as a result of reading by the reader of the terminal that metal fibers or conductive polymer fibers are present on the RFID tag; and
- recognizing a second identification(ID) code contained in a tag chip of the RFID tag;
- wherein the second ID code is transmitted to the terminal by an antenna of the RFID tag, and the first ID code is transmitted to the terminal by a signal reflected by the metal fibers or conductive polymer fibers;
- wherein the tag chip is configured to operate independently from the metal fibers or conductive polymer fibers;
- wherein the RFID tag comprises a base film, a transparent resin, an antenna, and the tag chip;
- wherein a lower surface of the antenna directly contacts an upper surface of the transparent resin layer;
- wherein a lower surface of the tag chip directly contacts an upper surface of the antenna;
- wherein the antenna comprises:
  - a first antenna member formed on the transparent resin layer, and
  - a second antenna member formed on the transparent resin layer and spaced apart from the first antenna member; and
- wherein the lower surface of the tag chip comprises:
  - a first region directly contacting an upper surface of the first antenna member,
  - a second region directly contacting an upper surface of the second antenna member, and
  - a third region disposed between the first region and the second region.

14. A method for controlling an RFID system, the method comprising:
- reading an RFID tag using a reader of a terminal;
- determining whether metal fibers or conductive polymer fibers are present on the RFID tag as a result of reading by the reader of the terminal;
- recognizing a first identification (ID) code contained in the metal fibers or the conductive polymer fibers of the RFID tag, if it is determined as a result of reading by the reader of the terminal that metal fibers or conductive polymer fibers are present on the RFID tag;

recognizing a second identification (ID) code contained in a tag chip of the RFID tag;

determining whether the first ID code and the second ID code are matched;

transmitting a third ID code to a server including added information, if the first ID and the second ID are matched;

determining whether the third ID code received by the server has a right to issue added information; and transmitting and issuing, by the server, the added information to the terminal, if the third ID code received by the server has the right to issue the added information;

wherein the second ID code is transmitted to the terminal via an antenna of the RFID tag, and the first ID code is transmitted to the terminal by a signal reflected by the metal fibers or conductive polymer fibers;

wherein the tag chip is configured to operate independently from the metal fibers or conductive polymer fibers;

wherein the RFID tag comprises a base film, a transparent resin, an antenna, and the tag chip;

wherein a lower surface of the antenna directly contacts an upper surface of the transparent resin layer;

wherein a lower surface of the tag chip directly contacts an upper surface of the antenna;

wherein the antenna comprises:

a first antenna member formed on the transparent resin layer, and a second antenna member formed on the transparent resin layer and spaced apart from the first antenna; and wherein the lower surface of the tag chip comprises:

a first region directly contacting an upper surface of the first antenna member, a second region directly contacting an upper surface of the second antenna member, and a third region disposed between the first region and the second region.

15. The method of claim 14, wherein that the third ID code is an ID code generated by using the first ID code or the second ID code, or the first ID code and the second ID code.

\* \* \* \* \*